United States Patent
Sayed et al.

(10) Patent No.: US 12,534,622 B2
(45) Date of Patent: Jan. 27, 2026

(54) BIODEGRADABLE ARTICLES COMPRISING DECOMPOSITION PRODUCTS FROM BIODEGRADABLE MATERIALS AND RELATED METHODS

(71) Applicant: BIOHM Ltd., London (GB)

(72) Inventors: Ehab Sayed, London (GB); Francesco Verderosa, London (GB); Jonathan Woods, Glasgow (GB); Irene Li Barnett, London (GB)

(73) Assignee: BIOHM Ltd., London (GB)

( * ) Notice: Subject to any disclaimer, the term of this patent is extended or adjusted under 35 U.S.C. 154(b) by 145 days.

(21) Appl. No.: 18/391,060

(22) Filed: Dec. 20, 2023

(65) Prior Publication Data

US 2024/0218185 A1   Jul. 4, 2024

Related U.S. Application Data

(60) Provisional application No. 63/436,471, filed on Dec. 30, 2022.

(51) Int. Cl.
*C08L 97/02*   (2006.01)

(52) U.S. Cl.
CPC ........... *C08L 97/02* (2013.01); *C08L 2201/06* (2013.01)

(58) Field of Classification Search
CPC ......... B09B 2101/70; B09B 3/21; B09B 3/32; B27N 1/00; B27N 3/007; B27N 3/02; B27N 7/005; B29C 43/003; C08L 2201/06; C08L 3/02; C08L 5/00; C08L 97/005; C08L 97/02
See application file for complete search history.

(56) References Cited

U.S. PATENT DOCUMENTS

| | | |
|---|---|---|
| 5,532,330 A | 7/1996 | Pizzi et al. |
| 6,472,497 B2 | 10/2002 | Loercks et al. |
| 7,183,339 B2 | 2/2007 | Shen et al. |
| 7,780,792 B2 | 8/2010 | Thornton et al. |
| 7,998,888 B2 | 8/2011 | Shi et al. |
| 8,877,992 B2 | 11/2014 | Appel et al. |
| 9,039,792 B2 | 5/2015 | Dale et al. |
| 9,809,687 B2 | 11/2017 | Immonen et al. |
| 9,914,256 B2 | 3/2018 | Tamir |
| 9,926,442 B2 | 3/2018 | Henry et al. |
| 9,938,397 B2 | 4/2018 | Torkelson et al. |
| 10,344,309 B2 | 7/2019 | Redford et al. |
| 10,457,810 B2 | 10/2019 | Dale et al. |
| 2002/0130439 A1 | 9/2002 | Kroner et al. |
| 2003/0068427 A1 | 4/2003 | Wysocki |

(Continued)

FOREIGN PATENT DOCUMENTS

| | | |
|---|---|---|
| CA | 2885853 A1 | 4/2014 |
| CN | 101712804 A | 5/2010 |

(Continued)

OTHER PUBLICATIONS

International Search Report and Written Opinion for International Application No. PCT/EP2023/086130 dated Apr. 18, 2024.

(Continued)

*Primary Examiner* — Lawrence D Ferguson
(74) *Attorney, Agent, or Firm* — Wolf, Greenfield & Sacks, P.C.

(57) ABSTRACT

The present disclosure describes articles that include decomposition products from biodegradable compounds, and related methods.

18 Claims, 3 Drawing Sheets

(56) References Cited

U.S. PATENT DOCUMENTS

| | | |
|---|---|---|
| 2010/0291822 A1 | 11/2010 | Netravali |
| 2010/0311874 A1 | 12/2010 | Mentink et al. |
| 2018/0002451 A1 | 1/2018 | Ge et al. |
| 2022/0211160 A1 | 7/2022 | Parssinen et al. |

FOREIGN PATENT DOCUMENTS

| | | |
|---|---|---|
| CN | 101942702 A | 1/2011 |
| CN | 102133967 A | 7/2011 |
| CN | 107286602 A | 10/2017 |
| EP | 0 137 608 A2 | 4/1985 |
| EP | 0 400 531 A1 | 12/1990 |
| JP | 2010-280152 A | 12/2010 |
| WO | WO 97/03120 A1 | 1/1997 |
| WO | WO 97/03121 A1 | 1/1997 |
| WO | WO 02/48198 A1 | 6/2002 |
| WO | WO 03/035753 A1 | 5/2003 |
| WO | WO 2012/087250 A1 | 6/2012 |

OTHER PUBLICATIONS

Rivas-Cantu et al., A citrus waste-based biorefinery as a source of renewable energy: technical advances and analysis of engineering challenges. Waste Manag Res. Apr. 2013;31(4):413-20. doi: 10.1177/0734242X13479432. Epub Feb. 25, 2013.

Abdullah et al., Effect of microcrystalline cellulose on characteristics of cassava starch-based bioplastic. Polym Plast Tech Mater. Mar. 2020;59(12):1250-8.

Ahmed et al., Bioprocessing of citrus waste peel for induced pectinase production by Aspergillus niger; its purification and characterization. J Radiat Res Appl Sci. Apr. 2016;9(2):148-54.

Alvarez et al., Development of self-bonded fiberboards from fiber of leaf plantain: Effect of water and organic extractives removal. BioRes. 2015;10(1):672-83.

Anjum et al., Synergistic effect of co-digestion to enhance anaerobic degradation of catering waste and orange peel for biogas production. Waste Manag Res. Sep. 2017;35(9):967-977. doi: 10.1177/0734242X17715904. Epub Jul. 22, 2017.

Antov et al., Sustainable Bio-Based Adhesives for Eco-Friendly Wood Composites. A Review. Wood Res. 2020;65(1):51-62.

Basnett et al., 8-Natural bacterial biodegradable medical polymers: Polyhydroxyalkanoates. Science and Principles of Biodegradable and Bioresorbable Medical Polymers. 2017:257-77.

Bharate et al., Non-enzymatic browning in citrus juice: chemical markers, their detection and ways to improve product quality. J Food Sci Technol. Oct. 2014;51(10):2271-88. doi: 10.1007/s13197-012-0718-8. Epub May 10, 2012.

Borcsok et al., The role of lignin in wood working processes using elevated temperatures: an abbreviated literature survey. Eur J Wood Wood Prod. Dec. 2020;79:511-26.

Chisenga et al., Characterization of physicochemical properties of starches from improved cassava varieties grown in Zambia. AIMS Agriculture and Food. Nov. 2019;4(4):939-66.

De Freitas et al., Removal of bisphenol A by laccases from Pleurotus ostreatus and Pleurotus pulmonarius and evaluation of ecotoxicity of degradation products. Chem Eng J. Dec. 15, 2017;330:1361-9. Accepted Manuscript.

Jimenez et al., Tannin degradation by a novel tannase enzyme present in some *Lactobacillus plantarum* strains. Appl Environ Microbiol. May 2014;80(10):2991-7. doi: 10.1128/AEM.00324-14. Epub Mar. 7, 2014.

Kosseva et al., Chapter 3—Sources, characteristics and treatment of plant-based food waste. Food Ind Wastes. 2020;2:37-66.

Lisperguer et al., Structure and Thermal Behavior of Tannins From Acacia dealbata Bark and Their Reactivity Toward Formaldehyde. J Chil Chem Soc. Dec. 2016;61(4):3188-90.

Lora et al., Recent Industrial Applications of Lignin: A Sustainable Alternative to Nonrenewable Materials. J Polym Environ. Apr. 2002;10:39-48.

Manjarres-Pinzon et al., Effect of drying conditions on the physical properties of impregnated orange peel. Braz J Chem Eng. Sep. 2013;30(3):667-76.

Martinez-Hernandez et al., Sugarcane Bagasse Valorization Strategies for Bioethanol and Energy Production. Sugarcane Tech Res. Dec. 20, 2017;4:71-83.

Milstein et al., Enzymatic co-polymerization of lignin with low-molecular mass compounds. Appl Microbiol Biotechnol. 1994;40:760-7.

Nasir et al., Laccase, an emerging tool to fabricate green composites: A review. BioRes. 2015;10(3):6262-84.

Pagliano et al., Integrated systems for biopolymers and bioenergy production from organic waste and by-products: a review of microbial processes. Biotechnol Biofuels. May 2, 2017;10:113. doi: 10.1186/s13068-017-0802-4.

Pauline, Extraction of Orange Oil by Improved Steam Distillation and its Characterization Studies. Int J Eng Tech Manage Appl Sci. Feb. 2015;3(2): 9 pages.

Pizzi et al., Autocondensation-based, zero-emission, tannin adhesives for particleboard. Holz als Roh-und Werkstoff. Jun. 1995;53:201-4.

Pizzi, Tannins: Prospectives and Actual Industrial Applications. Biomolecules. Aug. 5, 2019;9(8):344. doi: 10.3390/biom9080344.

Ploypetchara et al., Effect of sugar on starch edible film properties: plasticized effect. J Food Sci Technol. Sep. 2018;55(9):3757-3766. doi: 10.1007/s13197-018-3307-7. Epub Jul. 13, 2018.

Rajan et al., Bio-based Thermoplastics for Additive Manufacturing by Material Extrusion Method. Ecolabnet. Jun. 2021: 5 pages.

Ranganathan et al., Utilization of food waste streams for the production of biopolymers. Heliyon. Sep. 16, 2020;6(9):e04891. doi: 10.1016/j.heliyon.2020.e04891.

Ruiz et al., Assessment of different pre-treatment methods for the removal of limonene in citrus waste and their effect on methane potential and methane production rate. Waste Manag Res. Dec. 2016;34(12):1249-1257. doi: 10.1177/0734242X16661053. Epub Aug. 1, 2016.

Surendran et al., Can Polyhydroxyalkanoates Be Produced Efficiently From Waste Plant and Animal Oils? Front Bioeng Biotechnol. Mar. 17, 2020;8:169. doi: 10.3389/fbioe.2020.00169.

Tobiszewski et al., Green Chemistry Metrics with Special Reference to Green Analytical Chemistry. Molecules. Jun. 12, 2015;20(6):10928-46. doi: 10.3390/molecules200610928.

Tsang et al., Production of bioplastic through food waste valorization. Environ Int. Jun. 2019;127:625-644. doi: 10.1016/j.envint. 2019.03.076. Epub Apr. 13, 2019.

Vitrone et al., Binderless fiberboards for sustainable construction. Materials, production methods and applications. J Build Eng. Dec. 2021;44:102625.

Wheatley et al., Cassava | The Nature of the Tuber. Encyclopedia of Food Sciences and Nutrition. Dec. 2003;2:964-9.

Yaradoddi et al., Bio-based material from fruit waste of orange peel for industrial applications. J Mater Res Tech. Mar.-Apr. 2022;17:3186-97.

Zoghlami et al., Lignocellulosic Biomass: Understanding Recalcitrance and Predicting Hydrolysis. Front Chem. Dec. 18, 2019;7:874. doi: 10.3389/fchem.2019.00874.

Builders et al., Effect of pH on the physicochemical and binder properties of tigernut starch. Starch. Mar. 2014;66(3-4):281-93.

Felby et al., Native lignin for bonding of fiber boards—evaluation of bonding mechanisms in boards made from laccase-treated fibers of beech (*Fagus sylvatica*). Ind Crops Prod. Sep. 2004;20(2):181-9.

Felby et al., Pilot-scale production of fiberboards made by laccase oxidized wood fibers: board properties and evidence for cross-linking of lignin. Enzy Microbial Tech. Nov. 1, 2002;31(6):734-41.

Navarrete et al., Wood Panel Adhesives from Low Molecular Mass Lignin and Tannin without Synthetic Resins. JAST. 2010;24(8-10):1597-610.

BIODEGRADABLE ARTICLES COMPRISING DECOMPOSITION PRODUCTS FROM BIODEGRADABLE MATERIALS AND RELATED METHODS

RELATED APPLICATIONS

This Application claims priority under 35 U.S.C. § 119 (e) to U.S. Provisional Application No. 63/436,471, filed Dec. 30, 2022, and entitled "BIODEGRADABLE ARTICLES COMPRISING DECOMPOSITION PRODUCTS FROM BIODEGRADABLE MATERIALS AND RELATED METHODS," which is incorporated herein by reference in their entirety for all purposes.

TECHNICAL FIELD

Articles comprising a biodegradable material and an intrinsic binder comprising a decomposition product of the biodegradable material, and methods for producing the same, are generally described.

BACKGROUND

In a pristine, natural, non-human impacted world, "waste" would be non-existent, where all things generated as an output would be a useful input into another system, serving as an essential component of nutrients to be recirculated and be participants in multiple ecosystems. Of course, in a human-impacted world, the quantity alone of waste streams generated worldwide is sufficient to negatively impact the planet.

One third of all food produced globally today is wasted; agricultural and food systems produce a staggering 1.3 billion tonnes that goes uneaten. Contributing to this waste, the construction industry is one of the largest contributors to the climate crisis. The World Economic Forum has highlighted the industry's waste as a major sustainability challenge with annual waste figures expected to rise to 2.2 billion tonnes per year by 2025. Accordingly, articles and methods for reducing and/or recycling waste and repurposing the waste into useful articles would be beneficial.

SUMMARY

The present disclosure describes articles that include a biodegradable material held together, at least in part, by an intrinsic binder that is derived from the biodegradable material itself (e.g., comprising a decomposition product of the biodegradable product). Decomposition products derived from various waste feedstocks such as discarded orange peels, coffee chaff, and other common organic waste from households and various industries can be generated and used. These decomposition products may form an intrinsic binder that binds portions of the remaining biodegradable material (e.g., a degraded material) of the article. This disclosure also describes methods of producing articles comprising the intrinsic binder. The subject matter of the present disclosure involves, in some cases, interrelated products, alternative solutions to a particular problem, and/or a plurality of different uses of one or more systems and/or articles.

In one aspect, an article is described, the article comprising a biodegradable material comprising a wt % of lignin of greater than or equal to 17 wt % and/or less than or equal to 31 wt % and having a first portion and a second portion; and an intrinsic binder comprising a decomposition product of the biodegradable material, wherein: a thickness of the article is greater than or equal to 1 mm and/or less than or equal to 25 mm; a porosity of the article is greater than or equal to 25% and less than or equal to 80%; a density of the biodegradable material and/or the intrinsic binder is greater than or equal to 0.8 g/cm$^3$ and less than or equal to 1.5 g/cm$^3$; and an amount of glucan in the article is less than or equal to 47 wt %.

In another aspect, an article is described, the article comprising a biodegradable material comprising a wt % of lignin of greater than or equal to 17 wt % and/or less than or equal to 31 wt % and having a first portion and a second portion; and an intrinsic binder comprising a decomposition product of the biodegradable material, wherein: a thickness of the article is greater than or equal to 1 mm and/or less than or equal to 25 mm; a porosity of the article is greater than or equal to 25% and less than or equal to 80%; a density of the biodegradable material and/or the intrinsic binder is greater than or equal to 0.8 g/cm$^3$ and less than or equal to 1.5 g/cm$^3$; and an amount of glucan in the article is greater than or equal to 54 wt %.

In another aspect, an article is described, the article comprising a biodegradable material comprising a wt % of lignin of greater than or equal 0.05 wt % and/or less than or equal to 7 wt % and having a first portion and a second portion; and an intrinsic binder comprising a decomposition product of the biodegradable material, wherein the intrinsic binder is bound to the first portion and the second portion of the biodegradable material, wherein: a thickness of the article is greater than or equal to 1 mm and/or less than or equal to 25 mm; a porosity of the article is greater than or equal to 25% and less than or equal to 80%; a density of the article is greater than or equal to 0.3 g/cm$^3$ and less than or equal to 1.8 g/cm$^3$; and an amount of glucan in the article is not between 47 wt % and 54 wt %.

In another aspect, an article is described, the article comprising a biodegradable material comprising a wt % of lignin of greater than or equal 0.05 wt % and/or less than or equal to 7 wt % and having a first portion and a second portion; and an intrinsic binder comprising a decomposition product of the biodegradable material, wherein the intrinsic binder is bound to the first portion and the second portion of the biodegradable material, wherein: a thickness of the article is greater than or equal to 1 mm and/or less than or equal to 25 mm; a porosity of the article is greater than or equal to 25% and less than or equal to 80%; a density of the article is greater than or equal to 0.3 g/cm$^3$ and less than or equal to 1.8 g/cm$^3$; and an amount of glucan in the article is less than or equal to 47 wt %.

In another aspect, an article is described, the article comprising a biodegradable material comprising a wt % of lignin of greater than or equal 0.05 wt % and/or less than or equal to 7 wt % and having a first portion and a second portion; and an intrinsic binder comprising a decomposition product of the biodegradable material, wherein the intrinsic binder is bound to the first portion and the second portion of the biodegradable material, wherein: a thickness of the article is greater than or equal to 1 mm and/or less than or equal to 25 mm; a porosity of the article is greater than or equal to 25% and less than or equal to 80%; a density of the article is greater than or equal to 0.3 g/cm$^3$ and less than or equal to 1.8 g/cm$^3$; and an amount of glucan in the article is greater than or equal to 54 wt %.

In another aspect, an article is described, the article comprising a biodegradable material comprising a wt % of lignin of greater than or equal 0.05 wt % and/or less than or equal to 7 wt % and having a first portion and a second portion; and an intrinsic binder comprising a decomposition product of the biodegradable material, wherein the intrinsic binder is bound to the first portion and the second portion of the biodegradable material, wherein: a thickness of the article is greater than or equal to 1 mm and/or less than or equal to 25 mm; a porosity of the article is greater than or equal to 25% and less than or equal to 80%; a density of the article is greater than or equal to 0.3 g/cm$^3$ and less than or equal to 1.8 g/cm$^3$; and an amount of glucan in the article is not between 47 wt % and 54 wt %.

In a different aspect, a method is described, the method comprising, with a biodegradable material comprising a wt % of lignin of greater than or equal 0.05 wt % and/or less than or equal to 7 wt % and having a first portion and a second portion, performing the steps of: reducing a particle size of the biodegradable material to an average diameter of less than or equal to 10 mm and/or greater than or equal to 1 mm; degrading at least a portion of the biodegradable material into a decomposition product of the biodegradable material and a degraded material; forming an intrinsic binder comprising the decomposition product of the biodegradable material, wherein the intrinsic binder is bound to the first portion and the second portion of the biodegradable material, wherein an amount of glucan in the article is less than or equal to 47 wt %.

In a another aspect, a method is described, the method comprising, with a biodegradable material comprising a wt % of lignin of greater than or equal 0.05 wt % and/or less than or equal to 7 wt % and having a first portion and a second portion, performing the steps of: reducing a particle size of the biodegradable material to an average diameter of less than or equal to 10 mm and/or greater than or equal to 1 mm; degrading at least a portion of the biodegradable material into a decomposition product of the biodegradable material and a degraded material; forming an intrinsic binder comprising the decomposition product of the biodegradable material, wherein the intrinsic binder is bound to the first portion and the second portion of the biodegradable material, wherein an amount of glucan in the article is greater than or equal to 54 wt %.

In yet another aspect, a method is described, the method comprising, with a biodegradable material comprising a wt % of lignin greater than or equal to 17 wt % and/or less than or equal to 31 wt % and having a first portion and a second portion, performing the steps of: reducing a particle size of the biodegradable material to an average diameter of less than or equal to 0.005 mm and/or greater than or equal to 15 mm; degrading at least a portion of the biodegradable material into a decomposition product of the biodegradable material and a degrade material; forming an intrinsic binder comprising the decomposition product of the biodegradable material, wherein the intrinsic binder is bound to the first portion and the second portion of the biodegradable material, wherein an amount of glucan in the article is not between 47 wt % and 54 wt %.

In a different aspect, a method is described, the method comprising, with a biodegradable material comprising a wt % of lignin of greater than or equal 0.05 wt % and/or less than or equal to 7 wt % and having a first portion and a second portion, performing the steps of: reducing a particle size of the biodegradable material to an average diameter of less than or equal to 10 mm and/or greater than or equal to 1 mm; degrading at least a portion of the biodegradable material into a decomposition product of the biodegradable material and a degraded material; forming an intrinsic binder comprising the decomposition product of the biodegradable material, wherein the intrinsic binder is bound to the first portion and the second portion of the biodegradable material, wherein an amount of glucan in the article is less than or equal to 47 wt %.

In a different aspect, a method is described, the method comprising, with a biodegradable material comprising a wt % of lignin of greater than or equal 0.05 wt % and/or less than or equal to 7 wt % and having a first portion and a second portion, performing the steps of: reducing a particle size of the biodegradable material to an average diameter of less than or equal to 10 mm and/or greater than or equal to 1 mm; degrading at least a portion of the biodegradable material into a decomposition product of the biodegradable material and a degraded material; forming an intrinsic binder comprising the decomposition product of the biodegradable material, wherein the intrinsic binder is bound to the first portion and the second portion of the biodegradable material, wherein an amount of glucan in the article is greater than or equal to 54 wt %.

In yet another aspect, a method is described, the method comprising, with a biodegradable material comprising a wt % of lignin greater than or equal to 17 wt % and/or less than or equal to 31 wt % and having a first portion and a second portion, performing the steps of: reducing a particle size of the biodegradable material to an average diameter of less than or equal to 0.005 mm and/or greater than or equal to 15 mm; degrading at least a portion of the biodegradable material into a decomposition product of the biodegradable material and a degrade material; forming an intrinsic binder comprising the decomposition product of the biodegradable material, wherein the intrinsic binder is bound to the first portion and the second portion of the biodegradable material, wherein an amount of glucan in the article is not between 47 wt % and 54 wt %.

Other advantages and novel features of the present disclosure will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
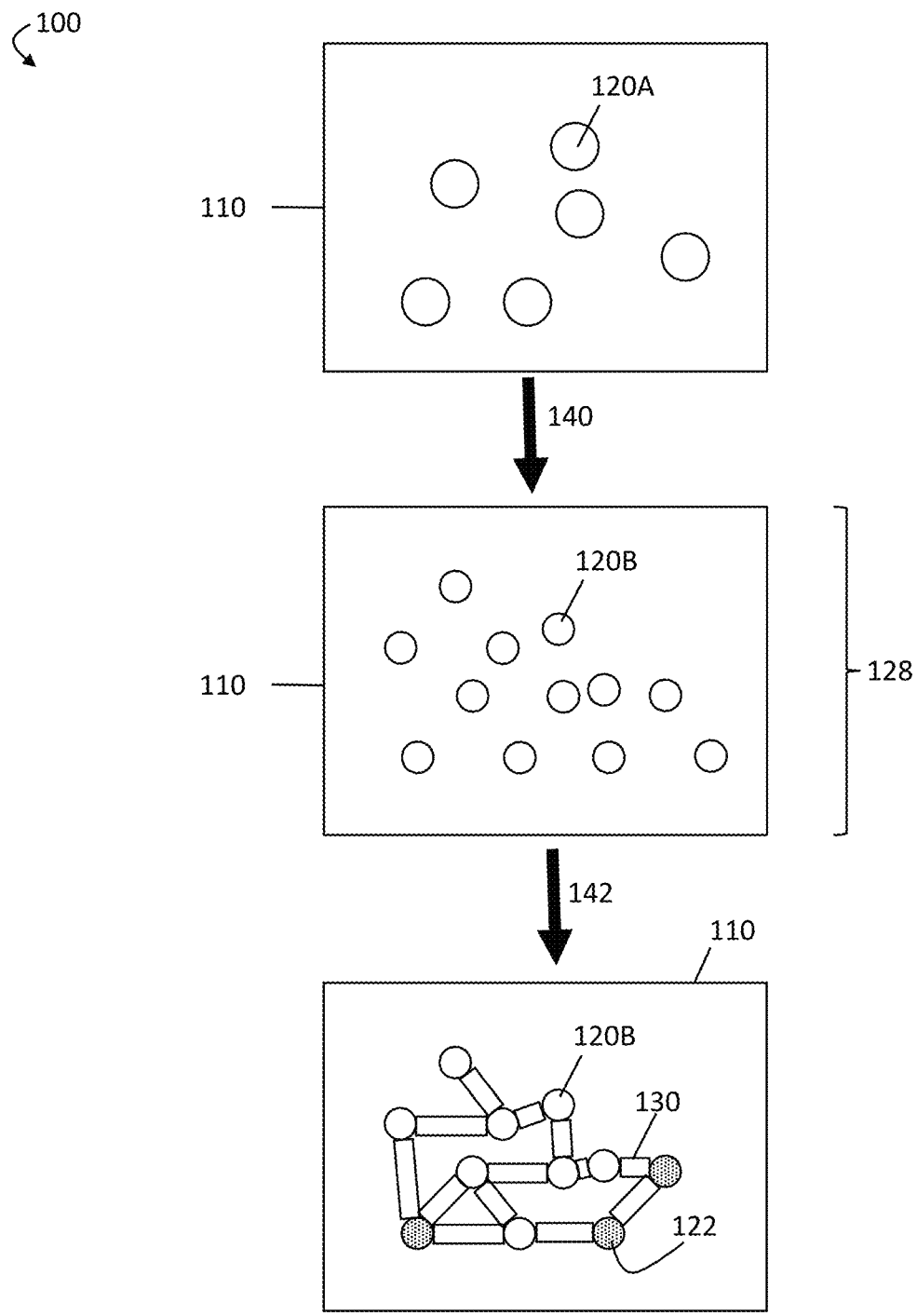
FIGS. 1A-1C show methods for forming an article from a biodegradable material, according to some embodiments.

Described by the disclosure below are articles (e.g., mats) that reduce the amount of common organic waste by recycling this waste into useable and recyclable articles suitable for a variety of purposes, including construction, packaging, and insulation. These applications and other applications are described in more detail below. Derived from waste materials, the articles described herein find a balance between biodegradability, so as not to create future waste products, and robustness, so as to meet the demands of the user (e.g., flexibility, rigidity, water resistance). Adopting this philosophy of waste, this "waste" can be transformed into a valuable articles (e.g., a mat) that can be recirculated and recycled. A broad range of waste streams can be used as a feedstock to make articles (e.g., mats, composite materials) with tunable properties, for example, tunable mechanical properties (e.g., flexible, rigid, thermoplastic behavior) and/or tunable chemical properties (e.g., water resistant).

Also described are methods that convert waste (e.g., excess resources, by-products from existing industries) into articles with desirable properties suitable for high-demand applications and products. These methods include a variety of processing techniques including grinding, shredding, milling (e.g., hammermilling, ball milling), acid treatments, pressing and/or steam treatments (e.g., steam exploding). Other techniques may also be included and are described in more detail below.

Various embodiments describe biodegradable articles comprising an intrinsic binder, wherein the intrinsic binder comprise a decomposition product of a biodegradable material of the article, and methods for processing these biodegradable materials (e.g., waste feedstocks, such as discarded orange peels, coffee chaff) to produce decomposition products of the biodegradable that can reduce or eliminate the need for additional additives (e.g., external binders) to the article. In some embodiments, one or more decomposition products may form (at least a part) the intrinsic binder, which can bind the remaining biodegradable material (e.g., particles of the biodegradable material and/or the degraded biodegradable material) to itself, thereby forming an article comprising the biodegradable material and the remaining biodegradable material and the intrinsic binder.

By way of comparison, many existing materials produced from biodegradable waste feedstocks require the inclusion of an external binding agent in order to hold the feedstock (i.e., remaining particles of the feedstock) together into one, cohesive unit. For example, one existing material can be prepared from waste wood pulp derived from an industrial process. The wood pulp can be processed by shredding the wood pulp into smaller pieces, and the smaller pieces can be held together by an external binder that adheres the pieces of shredded wood pulp to one another. However, these external binders can negatively affect the resultant properties of the material, for example, by making the material too stiff or lowering the recyclability or reusability of the material.

It has been appreciated in the context of the present disclosure that the amount of external binder (and/or other additives) can be dramatically reduced, and in some cases, eliminated, using the articles and methods provided herein. By processing the biodegradable waste feedstock (e.g., a biodegradable material) to release certain decomposition products, these decomposition products can form a binder derived directly from the biodegradable material that can act as a binding agent (i.e., an intrinsic binder). That is, in some embodiments, the biodegradable material (e.g., biodegradable material from a waste feedstock) is processed such that at least a portion of the biodegradable material produces an intrinsic binder that comprise a decomposition product of the biodegradable material. This intrinsic binder can be used to hold together remaining portions of the biodegradable material (e.g., portions of the biodegradable material, degraded material) and/or additional components of the article comprising the intrinsic binder.

In some cases, an external binder can be added, but the amount of this external binder required to hold the remaining feedstock material together is less than would be required in the absence of the intrinsic binder, thereby mitigating or eliminating the negative properties imparted to a comparable existing material with the external binder but no intrinsic binder. In other cases, however, no external binder is added at all, and the article is held together (at least in part) by the intrinsic binder.

As described above, in some embodiments, a biodegradable material is processed to produce a decomposition product. In some embodiments, the decomposition product comprises organic polymers (e.g., cellulose, lignin, hemicellulose). In some such embodiments, an intrinsic binder is formed, at least in part, from the decomposition product. In some such embodiments, a plurality of decomposition products of the biodegradable material can be produced, and at least some of these decomposition products forms the intrinsic binder. The biodegradable material need not be completely decomposed in order to form a decomposition product. For many embodiments, the biodegradable material is only partially degraded such that it forms a decomposition product and a degraded material, the degraded material comprising decomposed portions of the biodegradable material. The intrinsic binder can then bind remaining portions of the biodegradable material with the degraded material to form a cohesive unit binding portions of the biodegradable material with one another and/or with portions of the degraded material.

It should be understood, however, that for some embodiments, the biodegradable material is processed such that most or all of the biodegradable material is converted into one or more decomposition products, such that an article (e.g., a mat) comprises portions of biodegradable material held together by an intrinsic binder comprising the one or more decomposition products, with little to no degraded material present within the article. That is, in some embodiments, an article comprises portions of the biodegradable material held together by the intrinsic binder, with little or no degraded material within the article.

In some embodiments, an article includes a biodegradable material and a relatively high amount of degraded material. In some embodiments, an amount of degraded material in the article is greater than or equal to 20 wt %, greater than or equal to 30 wt %, greater than or equal to 40 wt %, greater than or equal to 45 wt %, greater than or equal to 50 wt %, greater than or equal to 55 wt %, greater than or equal to 60 wt %, greater than or equal to 65 wt %, greater than or equal to 70 wt %, greater than or equal to 75 wt %, greater than or equal to 80 wt %, greater than or equal to 85 wt %, or greater than or equal to 90 wt %, with respect to the total weight of the article. In some embodiments, the amount of degraded material in the article is less than or equal to 90 wt %, less than or equal to 85 wt %, less than or equal to 80 wt %, less than or equal to 75 wt %, less than or equal to 70 wt %, less than or equal to 65 wt %, less than or equal to 60 wt %, less than or equal to 55 wt %, less than or equal to 50 wt %, less than or equal to 45 wt %, less than or equal to 40 wt %, less than or equal to 30 wt %, or less than or equal to 20 wt %, with respect to the total weight of the article. Combinations of the above-referenced ranges are also possible (e.g., greater than or equal to 40 wt % and less than or equal to 90 wt %). Other ranges are possible. The remaining weight percentage (e.g., to total 100 wt %) of the article can be the biodegradable material, the intrinsic binder, and/or other additives (e.g., an external binder, antimicrobial agents).

In some embodiments, an article includes a biodegradable material and a relatively low amount of degraded material. In some embodiments, the amount of degraded material in the article is less than or equal to 20 wt %, less than or equal to 15 wt %, less than or equal to 12 wt %, less than or equal to 10 wt %, less than or equal to 9 wt %, less than or equal to 7 wt %, less than or equal to 5 wt %, less than or equal to 3 wt %, less than or equal to 2 wt %, less than or equal to 1 wt %, or less than or equal to 0.1 wt %, with respect to the total weight of the article. In some embodiments, an amount of degraded material in the article is greater than or equal to 0.1 wt %, greater than or equal to 1 wt %, greater than or equal to 2 wt %, greater than or equal to 3 wt %, greater than or equal to 5 wt %, greater than or equal to 7 wt %, greater than or equal to 9 wt %, greater than or equal to 10 wt %, greater than or equal to 12 wt %, greater than or equal to 15 wt %, or greater than or equal to 20 wt %, with respect to the total weight of the article. Combinations of the above-referenced ranges are also possible (e.g., greater than or equal to 0.1 wt % and less than or equal to 20 wt %). Other ranges are possible. In some embodiments, the article comprises no degraded material. The remaining weight percentage (e.g., to total 100 wt %) of the article can be the biodegradable material, the intrinsic binder, and/or other additives (e.g., an external binder, antimicrobial agents).

As was mentioned above, the articles described herein comprise a biodegradable material, which can be decomposed (or at least partially decomposed) to form a degraded material and a decomposition product of the biodegradable material. The decomposition product, at least a portion of the decomposition product, and/or a further decomposition product of the decomposition product may form an intrinsic binder, wherein the intrinsic binder is bound to portions (e.g., a first portion, a second portion) of the biodegradable material. That is, in some embodiments, the intrinsic binder comprises a decomposition product of the biodegradable material, wherein the intrinsic binder is bound to the first portion and the second portion of the biodegradable material. In some embodiments, one or more decomposition compounds comprise one or more functional groups (e.g., —OH, —NH$_2$, —NH—) that facilitate crosslinking to adjacent species (e.g., crosslinking between portions of biodegradable portion with one another, portions of the degraded material with one another, portions of the biodegradable material and the degraded material with one another). Without wishing to be bound by any particular theory, the biodegradable material can be disrupted (e.g., to produce a decomposition product of the biodegradable material) and comprises structures (e.g., pockets, crevices) comprising hydroxyl groups, which can hydrogen bond (e.g., hydrogen bond donor and/or hydrogen bond acceptor) with other hydroxyl groups of the biodegradable material (e.g., a first portion of the biodegradable material) and/or other decomposition products.

In some embodiments, the biodegradable material is processed (e.g., ground, shredded) such that particles of the biodegradable material are formed. Details on processing are described in more details below, but, in brief, various embodiments may comprise the biodegradable material as particles of the biodegradable material. In some such embodiments, the intrinsic binder (e.g., comprising one or more decomposition products of the biodegradable material) may crosslink at least a portion of the particles of the biodegradable material and/or degraded material (e.g., particles of degraded material). In some such embodiments, the intrinsic binder forms a network of bonds (e.g., crosslinking) throughout the article. In some such embodiments, the article can then be formed into a sheet or a mat.

In some embodiments, at least a portion of the biodegradable material is crosslinked such that there are bonds connecting two or more components (e.g., two or more portions of the biodegradable to one another, two or more portions of the degraded material, two more portions of the biodegradable material and/or the degraded material) through at least one position of the intrinsic binder. For instance, an article may have a particular percentage of crosslinked material (e.g., by weight), wherein a portion (e.g., a first portion) of the biodegradable material may be linked to at least one position of the intrinsic binder and another portion (e.g., a second portion) of the biodegradable material. In some embodiments, crosslinking bonds are covalent bonds. In some embodiments, crosslinking bonds are non-covalent (e.g., ionic bonds, hydrogen bonds, dipole-dipole interactions, London dispersion forces). In some embodiments, crosslinking comprises a combination of covalent and/or non-covalent interactions.

In some embodiments, an article is greater than or equal to 20% crosslinked, by weight. That is, greater than or equal to 20% of the biodegradable material (e.g., portions of the biodegradable material, particles of the biodegradable material) that makes up the article, by weight, are crosslinked (e.g., through the intrinsic binder). In some embodiments, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, greater than or equal to 95 wt %, greater than or equal to 99 wt %, greater than or equal to 99.9 wt %, or greater than or equal to 99.99 wt % of the article is crosslinked by the intrinsic binder. In some embodiments, less than or equal to 99.99 wt %, less than or equal to 99.9 wt %, less than or equal to 99 wt %, less than or equal to 95 wt %, less than or equal to 90 wt %, less than or equal to 80 wt %, less than or equal to 70 wt %, less than or equal to 60 wt %, less than or equal to 50 wt %, less or equal to 40 wt %, less than or equal to 30 wt %, or less than or equal to 20 wt % of the article is crosslinked. Combinations of the above-referenced ranges are also possible (e.g., greater than or equal to 20 wt % and less than or equal to 99.99 wt %). Other ranges are possible.

In some embodiments, a biodegradable material is used to form an article. For example, FIG. 1A shows a method 100 for forming an article comprising a feedstock material that is or includes a. In FIG. 1A, reactor 110 is filled a biodegradable material comprising a of a first dimension 120A. As is described in more detail below, in some embodiments, the biodegradable material can be reduced in size. For example, in FIG. 1A the biodegradable material of the first dimension 120 is processed (process 140) to smaller size of the biodegradable material of a second dimension 125. During and/or after processing step 140, an intrinsic binder 130 may form from a decomposition product of a biodegradable material and may crosslink (e.g., via a binding step 142) or otherwise bind together the portions of the biodegradable material of the second size 120B. In some embodiments, the intrinsic binder also binds portions of degraded material (e.g., partially decomposed biodegradable material). For example, in FIG. 1A, the intrinsic binder 130 binds a degraded material 122 to other portions of the degraded material 122 and the biodegradable material of the second size 120B.

In some embodiments, in addition to an intrinsic binder, an external binder is added to the biodegradable material.

Figure 1B:
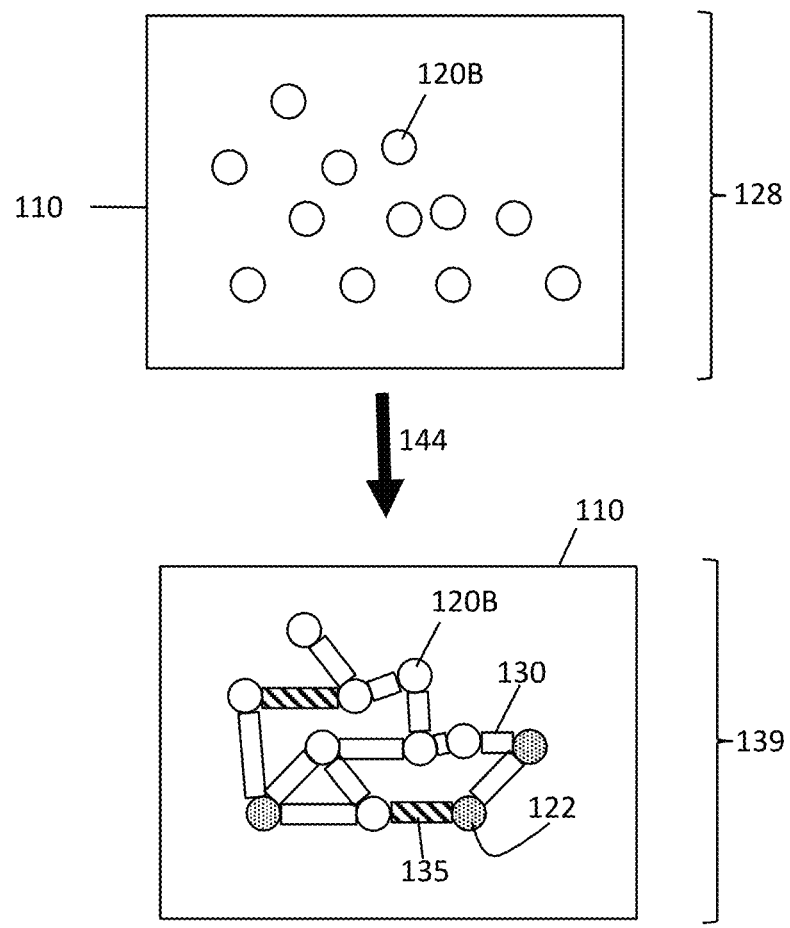

For example, FIG. 1B includes a process 144 in which an external binder 135 has been added, and both intrinsic binder 130 and external binder 135 crosslink or otherwise bind together the biodegradable material of a second dimension 120B. In some such embodiments, both the intrinsic binder and the external binder hold the biodegradable material together (e.g., bind particles of the biodegradable material to one another), shown as crosslinked material 139 in FIG. 1B.

Figure 1C:
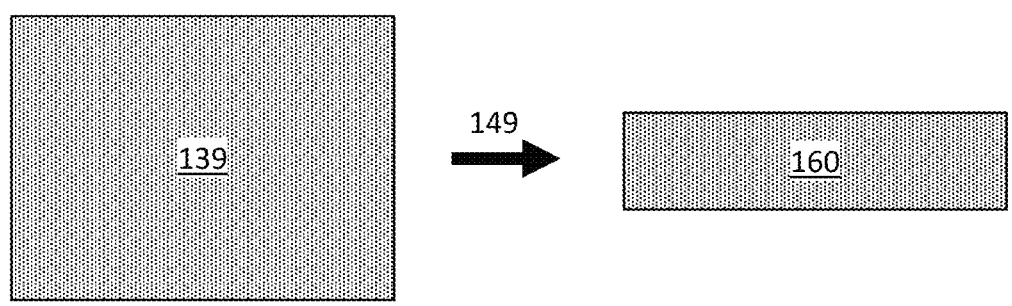

The methods described in FIGS. 1A-1B can be used to form an article. For example, in FIG. 1C, crosslinked material 139 is compressed (compression 149) to form an article 160, article 160 comprising crosslinked portions of the biodegradable material and the degraded material.

The articles described herein may have one or more advantageous properties as described herein. In one particular embodiment, the article comprises a biodegradable having a wt % of lignin of greater than or equal 0.05 wt % and/or less than or equal to 7 wt %, and an intrinsic binder comprising a decomposition product of the biodegradable material, wherein at least a portion of the intrinsic binder is bound to at least a portion of the biodegradable material (e.g., a first portion, a second portion) by the intrinsic binder. The thickness of the article is greater than or equal to 1 mm and/or less than or equal to 25 mm, a porosity of the article is greater than or equal to 25% and less than or equal to 80%, and a density of the article is greater than or equal to 0.3 g/cm$^3$ and less than or equal to 1.8 g/cm$^3$. In some cases, an amount of glucan in the article not between 47 wt % and 54 wt %.

As mentioned elsewhere herein, an article may comprise a biodegradable material, an intrinsic binder, and/or an external binder. The biodegradable material may comprise a variety of suitable materials. Non-limiting examples of biodegradable materials include orange peels, coffee chaff, grass clippings, coconut waste (e.g., coconut husk and/or shell), food waste, vegetation, and/or biodegradable polymers (e.g., polyhydroxyalkanoate). In some embodiments, the biodegradable material comprises hair (e.g., human hair). In some embodiments, the biodegradable material comprises lignin, cellulose, and/or hemicellulose. In some embodiments, the biodegradable material is selected to impart beneficial properties to the resulting article, such as bioresistence. For example, in some embodiments, the biodegradable material comprises an antimicrobial agent (e.g., limonene), and the resulting article may also have antimicrobial properties. Of course, other properties are possible, as this disclosure is not so limited, and additional properties are described elsewhere herein.

In some embodiments, the biodegradable material comprises a protein (e.g., keratin). In some embodiments, a wt % of a protein in the biodegradable material is greater than or equal to 15 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, or greater than or equal to 95 wt %, with respect to a total weight of the biodegradable material. In some embodiments, a wt % of a protein in the biodegradable material is less than or equal to 95 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, or less than or equal to 15 wt %, with respect to a total weight of the biodegradable material. Combinations of the above-referenced ranges are also possible (e.g., greater than or equal to 15 wt % and less than or equal to 95 wt %). Other ranges are possible.

In some cases, a biodegradable material (e.g., a biodegradable material of the article) comprises lignin. In some embodiments, the wt % of lignin in the biodegradable material is greater than or equal to 0.05 wt %, greater than or equal to 0.06 wt %, greater than or equal to 0.01 wt %, greater than or equal to 0.25 wt %, greater than or equal to 0.5 wt %, greater than or equal to 1 wt %, greater than or equal to 2 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 34 wt %, greater than or equal to 35 wt %, greater than or equal to 40 wt %, greater than or equal 45 wt %, or greater than or equal to 50 wt %, with respect to a total weight of the biodegradable material. In some embodiments, the wt % of lignin in the biodegradable material is less than or equal to 50 wt %, less than or equal to 45 wt %, less than or equal 40 wt %, less than or equal to 35 wt %, less than or equal to 34 wt %, less than or equal to 30 wt %, less than or equal to 25 wt %, less than or equal to 20 wt %, less than or equal to 15 wt % less than or equal to 10 wt %, less than or equal to 5 wt %, less than or equal to 2 wt %, less than or equal to 1 wt %, less than or equal to 0.5 wt %, less than or equal to 0.25 wt %, less than or equal to 0.01 wt %, less than or equal to 0.06 wt %, or less than or equal to 0.05 wt %, with respect to a total weight of the biodegradable material. Combinations of the above-referenced ranges are also possible (e.g., greater than or equal to 0.06 wt % and less than or equal to 34 wt %, greater than or equal to 0.05 wt % and less than or equal to 7 wt %). Other ranges are possible.

Various amounts of cellulose in the biodegradable material are also possible. In some cases, an amount of cellulose in the biodegradable material is greater than or equal to 6 wt %, greater than or equal to 7 wt %, greater than or equal to 8 wt %, greater than or equal to 10 wt %, greater than or equal to 12 wt %, greater than or equal to 14 wt %, greater than or equal to 16 wt %, or greater than or equal to 17 wt %, with respect to a total weight of the biodegradable material. In some embodiments, the amount of cellulose in the biodegradable material is less than or equal to 17 wt %, less than or equal to 16 wt %, less than or equal to 15 wt %, less than or equal to 13 wt %, less than or equal to 11 wt %, less than or equal to 9 wt %, less than or equal to 7 wt %, or less than or equal to 6 wt %, with respect to a total weight of the biodegradable material. Combinations of the above-referenced ranges are also possible (e.g., greater than or equal to 6 wt % and less than or equal to 17 wt %). Other ranges are also possible.

Various amounts of hemicellulose in the biodegradable material are also possible. In some cases, an amount of hemicellulose in the biodegradable material is greater than or equal to 6 wt %, greater than or equal to 7 wt %, greater than or equal to 8 wt %, greater than or equal to 10 wt %, greater than or equal to 12 wt %, greater than or equal to 14 wt %, greater than or equal to 16 wt %, or greater than or equal to 17 wt %, with respect to a total weight of the biodegradable material. In some embodiments, the amount of hemicellulose in the biodegradable material is less than or equal to 17 wt %, less than or equal to 16 wt %, less than or equal to 15 wt %, less than or equal to 13 wt %, less than or equal to 11 wt %, less than or equal to 9 wt %, less than or equal to 7 wt %, or less than or equal to 6 wt %, with respect to a total weight of the biodegradable material. Combinations of the above-referenced ranges are also possible (e.g., greater than or equal to 6 wt % and less than or equal to 17 wt %). Other ranges are also possible.

In some cases, the biodegradable material is processed (e.g., mechanically treated, chemically treated). Processing may comprise one or more steps (e.g., multiple steps), as described elsewhere herein. In some embodiments, the is processed such that a biodegradable material of a first size or dimension (e.g., a first average diameter) is reduced in a size or dimension to a second size or dimension of the biodegradable material.

In some cases, after processing (e.g., grinding, milling), the biodegradable material (e.g., of a first size, of a second size) may have an average diameter of less than or equal to 10 mm, less than or equal to 9 mm, less than or equal to 8 mm, less than or equal to 7 mm, less than or equal to 6 mm, less than or equal to 5 mm, less than or equal to 4 mm, less than or equal to 3 mm, less than or equal to 2 mm, or less than or equal to 1 mm. In some cases, the biodegradable material may have an average diameter of greater than or equal to 1 mm, greater than or equal to 2 mm, greater than or equal to 3 mm, greater than or equal to 4 mm, greater than or equal to 5 mm, greater than or equal to 6 mm, greater than or equal to 7 mm, greater than or equal to 8 mm, greater than or equal to 9 mm, or greater than or equal to 10 mm. Combinations of the above-referenced ranges are also possible (e.g., greater than or equal to 2 mm and less than or equal to 10 mm). Other ranges are possible.

As was described in some detail about, an article as described herein may comprises a biodegradable material and an intrinsic binder. In some cases, the intrinsic binder comprises a decomposition product of a biodegradable material. In some such cases, at least a portion of the decomposition product forms the intrinsic binder as described elsewhere herein. In some embodiments, the decomposition product forms the entirety of the intrinsic binder. In some embodiments, the decomposition product is configured to undergo one or more further reactions to form additional decomposition products of the biodegradable material, and these additional decomposition products may also form, in part, or the entirety, of the intrinsic binder. Mixtures of the decomposition product and/or additional decomposition products of the biodegradable material are possible. Accordingly, in some such cases, at least a portion of the intrinsic binder comprises the intrinsic binder.

In some embodiments, the biodegradable material and/or the intrinsic binder comprises species (e.g., lignin, hemicellulose, or the like) such that processing the species exposes functional groups (e.g., —OH, —NH—). Functional groups, once exposed, can bond with a portion of the biodegradable material, degraded material, and/or other portions of the intrinsic binder in order to form a network of bonds between the biodegradable material, the intrinsic binder, and/or an external binder.

In some cases, the intrinsic binder crosslinks the biodegradable material and/or the intrinsic binder. According to some embodiments, at least a portion of the intrinsic binder is bound to at least a portion of the biodegradable material (e.g., a first portion, a second portion) by the intrinsic binder. In some embodiments, crosslinking the portions of the biodegradable material and/or other portions of the intrinsic binder using the intrinsic binder forms an article (e.g., a mat, sheet, layer, composite).

In some embodiments, a particular amount of an intrinsic binder (e.g., comprising a decomposition product of the biodegradable material) is present in the article. In some embodiments, the intrinsic binder is present in the article at amount greater than or equal to 0.01 wt %, greater than or equal to 0.02 wt %, greater than or equal to 0.03 wt %, greater than or equal to 0.05 wt %, greater than or equal to 0.1 wt %, greater than or equal to 0.15 wt %, greater than or equal to 0.2 wt %, greater than or equal to 0.3 wt %, greater than or equal to 0.5 wt %, greater than or equal to 1 wt %, greater than or equal to 1.5 wt %, greater than or equal to 2 wt %, greater than or equal to 2.5 wt %, greater than or equal to 3 wt %, greater than or equal to 5 wt %, greater than or equal to 10 wt %, greater than or equal to 15 wt %, greater than or equal to 20 wt %, greater than or equal to 25 wt %, or greater than or equal to 30 wt % with respect to the total weight of the article. In some cases, the intrinsic binder is present at less than or equal to 30 wt %, less than or equal to 25 wt %, less than or equal to 20 wt %, less than or equal to 15 wt %, less than or equal to 10 wt %, less than or equal to 5 wt %, less than or equal to 3 wt %, less than or equal to 2.5 wt %, less than or equal to 2 wt %, less than or equal to 1.5 wt %, less than or equal to 1 wt %, less than or equal to 0.5 wt %, less than or equal to 0.3 wt %, less than or equal to 0.2 wt %, less than or equal to 0.15 wt %, less than or equal to 0.1 wt %, less than or equal to 0.05 wt %, less than or equal to 0.03 wt %, less than or equal to 0.02 wt %, or less than 0.01 wt % with respect to the total weight of the article. Combinations of the above-referenced ranges are possible (e.g., greater than or equal to 0.01 wt % and less than or equal to 20 wt %, greater than or equal to 0.01 wt % and less than or equal to 30 wt %). Other ranges are also possible.

According to some embodiments, an article comprising a biodegradable material, a degraded material, and/or an intrinsic binder may further comprise an external binder. In some cases, the external binder comprises tapioca starch, water, and/or a base. In some embodiments, the external binder comprises starch, thermoplastic starch, pectin, cellulose, chitin, chitosan, lignin, tannins, pine resin, and or a polyhydroxyalkanoate (PHA). In some cases, wherein the external binder comprises a starch, the starch may originate from a variety of sources. For example, suitable sources for starches include, cassava, potato, corn, barley, sorghum, and/or wheat. Combinations of these starches are also possible (for example, tapioca starch and potato starch). Additionally, combinations of external binders other than different types of starches are also contemplated (for example, starches and cellulose). Other combinations of external binders are also possible, as this disclosure is not so limited.

An external binder, in some cases, acts similarly to an intrinsic binder, in that it may crosslink a biodegradable material (e.g., portions of the biodegradable material), degraded material and/or the intrinsic binder (e.g., portions of the intrinsic binder). That is, the external binder may portions of the biodegradable material, portions of the degraded material, and/or portions of the intrinsic binder via covalent and/or non-covalent bonding. It is noted, however, that the crosslinking performed by the external binder can be, or need not be the same (e.g., chemically the same, having the same composition as the external binder) as the crosslinking performed by the intrinsic linker. As a non-limiting example, the external binder may crosslink a biodegradable material, degraded material, and/or the intrinsic binder using covalent bonds, whereas the intrinsic binder may crosslink the biodegradable material, degraded material and/or portions of the intrinsic binder using non-covalent bonds (e.g., ionic bonds, London dispersion forces). In some cases, the external binder binds at least a portion of the biodegradable material, at least a portion of the degraded material, and/or the intrinsic binder. Advantageously, in some embodiments, the presence of an external binder may not be necessary, as the intrinsic binder may crosslink the biodegradable material, the degraded material, and/or other portions of the intrinsic binder to form an article without the need for an external binder. However, a relatively small amount of external binder may be added to enhance properties of the article (e.g., increase stiffness, increase hydrophobicity).

In some embodiments, a particular amount of an external binder is present in the article. In some embodiments, the external binder is present in the article at amount greater than or equal to 0.01 wt %, greater than or equal to 0.02 wt %, greater than or equal to 0.03 wt %, greater than or equal to 0.05 wt %, greater than or equal to 0.1 wt %, greater than or equal to 0.15 wt %, greater than or equal to 0.2 wt %, greater than or equal to 0.3 wt %, greater than or equal to 0.5 wt %, greater than or equal to 1 wt %, greater than or equal to 1.5 wt %, greater than or equal to 2 wt %, greater than or equal to 2.5 wt %, greater than or equal to 3 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, or greater than or equal to 45 wt %, with respect to the total weight of the article. In some cases, the external binder is present at less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 5 wt %, less than or equal to 3 wt %, less than or equal to 2.5 wt %, less than or equal to 2 wt %, less than or equal to 1.5 wt %, less than or equal to 1 wt %, less than or equal to 0.5 wt %, less than or equal to 0.3 wt %, less than or equal to 0.2 wt %, less than or equal to 0.15 wt %, less than or equal to 0.1 wt %, less than or equal to 0.05 wt %, less than or equal to 0.03 wt %, less than or equal to 0.02 wt %, or less than 0.01 wt % with respect to the total weight of the article. Combinations of the above-referenced ranges are possible (e.g., greater than or equal to 0.01 wt % and less than or equal to 20 wt %, greater than or equal to 0.01 wt % and less than or equal to 30 wt %). Other ranges are also possible.

In some cases, the amount of external binder needed to form the article depends on the amount of intrinsic binder (e.g., comprising a decomposition product of a biodegradable material) formed from the decomposition of the biodegradable material, the intrinsic binder, or from another material in the article (e.g., degraded material, antimicrobial additives) and those skilled in the art, in view of the present disclosure, will be capable of selecting appropriate amounts of external binder (e.g., relative to the intrinsic binder). That is to say, in accordance with some embodiments, less external binder may be included in cases where there is relatively more intrinsic binder (relative to cases with less intrinsic binder).

In some embodiments, the article has a glucan content different than some existing materials. For example, in some embodiments, an amount of glucan in the article is not between 47 wt % and 54 wt % with respect to the total weight of the article. However, in other embodiments, an amount of glucan is between 47 wt % and 54 wt % with respect to the total weight of the article.

In some embodiments, an article has a relatively low amount of glucan (e.g., less than 47 wt %). In some embodiments, an amount of glucan in the article is greater than or equal to 0.1 wt %, greater than or equal to 1 wt %, greater than or equal to 5 wt %, greater than or equal to 10 wt %, greater than or equal to 20 wt %, greater than or equal to 30 wt %, greater than or equal to 40 wt %, or greater than or equal to 46 wt % with respect to the total weight of the article. In some embodiments, an amount of glucan in the article is less than 47 wt %, less than or equal to 46 wt %, less than or equal to 40 wt %, less than or equal to 30 wt %, less than or equal to 20 wt %, less than or equal to 10 wt %, less than or equal to 5 wt %, less than or equal to 1 wt %, or less than or equal to 0.1 wt % with respect to the total weight of the article. Combinations of the above-referenced ranges are also possible (e.g., greater than or equal to 1 wt % and less than or equal to 46 wt %). Other ranges are possible.

In other embodiments, an article has a relatively high amount of glucan (e.g., great than or equal to 55 wt %). In some embodiments, an amount of glucan in the article is greater than 54 wt %, greater than or equal to 55 wt %, greater than or equal to 60 wt %, greater than or equal to 65 wt %, or greater than or equal to 70 wt % with respect to the total weight of the article. In some embodiments, an amount of glucan in the article is less than 100 wt %, less than or equal to 90 wt %, less than or equal to 80 wt %, less than or equal to 70 wt %, or less than or equal to 60 wt % with respect to the total weight of the article. Combinations of the above-referenced ranges are also possible (e.g., greater than or equal to 55 wt % and less than or equal to 90 wt %). Other ranges are possible.

As discussed above, in some embodiments an article comprises a biodegradable material, an intrinsic binder, a degraded material, and/or an external binder. In some cases, the article comprises the biodegradable material at greater than or equal to 40 wt %, greater than or equal to 50 wt %, greater than or equal to 55 wt %, greater than or equal to 65 wt %, greater than or equal to 75 wt %, greater than or equal to 85 wt %, greater than or equal to 95 wt %, greater than or equal to 99 wt %, greater than or equal to 99.9 wt %, or greater than 99.99 wt % with respect to the total weight of the article. In some embodiments, the article comprises the biodegradable material at 100%, less than or equal to 99.99 wt %, less than or equal to 99.9 wt %, less than or equal to 99 wt %, less than or equal to 95 wt %, less than or equal to 85 wt %, less than or equal to 75 wt %, less than an equal to 65 wt %, less than an equal to 60 wt % of the biodegradable material, or less than or equal to 55 wt % with respect to the total weight of the article. Combinations of the above-referenced ranges are possible (greater than or equal to 55 wt % and less than or equal to 99 wt %). Other ranges are also possible.

In some cases, the article comprises lignin (e.g., from or derived from the biodegradable material). In some embodiments, the wt % of lignin in the article is greater than or equal to 0.05 wt %, greater than or equal to 0.06 wt %, greater than or equal to 0.01 wt %, greater than or equal to 0.25 wt %, greater than or equal to 0.5 wt %, greater than or equal to 1 wt %, greater than or equal to 2 wt %, greater than or equal to 5 wt %, greater than or equal to 10 wt %, greater than or equal to 15 wt %, greater than or equal to 20 wt %, greater than or equal to 25 wt %, greater than or equal to 30 wt %, or greater than or equal to 34 wt % with respect to a total weight of the article. In some embodiments, the wt % of lignin in the article is less than or equal to 34 wt %, less than or equal to 30 wt %, less than or equal to 25 wt %, less than or equal to 20 wt %, less than or equal to 15 wt % less than or equal to 10 wt %, less than or equal to 5 wt %, less than or equal to 2 wt %, less than or equal to 1 wt %, less than or equal to 0.5 wt %, less than or equal to 0.25 wt %, less than or equal to 0.01 wt %, less than or equal to 0.06 wt %, or less than or equal to 0.05 wt % with respect to a total weight of the article. Combinations of the above-referenced ranges are also possible (e.g., greater than or equal to 0.06 wt % and less than or equal to 34 wt %, greater than or equal to 0.05 wt % and less than or equal to 7 wt %). Other ranges are possible.

Various amounts of cellulose in the article (e.g., from or derived from the biodegradable material) are also possible. In some cases, an amount of cellulose in the article is greater than or equal to 6 wt %, greater than or equal to 7 wt %, greater than or equal to 8 wt %, greater than or equal to 10 wt %, greater than or equal to 12 wt %, greater than or equal to 14 wt %, greater than or equal to 16 wt %, or greater than or equal to 17 wt %, with respect to a total weight of the article. In some cases, an amount of cellulose in the article is greater than or equal to 20 wt %, greater than or equal to 30 wt %, greater than or equal to 40 wt %, or greater than or equal to 45 wt %, with respect to a total weight of the article. In some embodiments, the amount of cellulose in the article is less than or equal to 17 wt %, less than or equal to 16 wt %, less than or equal to 15 wt %, less than or equal to 13 wt %, less than or equal to 11 wt %, less than or equal to 9 wt %, less than or equal to 7 wt %, or less than or equal to 6 wt %, with respect to a total weight of the article. In some embodiments, the amount of cellulose in the article is less than or equal to 45 wt %, less than or equal to 40 wt %, less than or equal to 30 wt %, or less than or equal to 20 wt %, with respect to a total weight of the article. Combinations of the above-referenced ranges are also possible (e.g., greater than or equal to 6 wt % and less than or equal to 17 wt %). Other ranges are also possible.

Various amounts of hemicellulose in article (e.g., from or derived from the biodegradable material) are also possible. In some cases, an amount of hemicellulose in the article is greater than or equal to 6 wt %, greater than or equal to 7 wt %, greater than or equal to 8 wt %, greater than or equal to 10 wt %, greater than or equal to 12 wt %, greater than or equal to 14 wt %, greater than or equal to 16 wt %, or greater than or equal to 17 wt %, with respect to a total weight of the article. In some cases, an amount of hemicellulose in the article is greater than or equal to 19 wt %, greater than or equal to 20 wt %, or greater than or equal to 30 wt %, with respect to a total weight of the article. In some embodiments, the amount of hemicellulose in the article is less than or equal to 17 wt %, less than or equal to 16 wt %, less than or equal to 15 wt %, less than or equal to 13 wt %, less than or equal to 11 wt %, less than or equal to 9 wt %, less than or equal to 7 wt %, or less than or equal to 6 wt %, with respect to a total weight of the article. In some embodiments, the amount of hemicellulose in the article is less than or equal to 30 wt %, less than or equal to 20 wt %, or less than or equal to 19 wt %. Combinations of the above-referenced ranges are also possible (e.g., greater than or equal to 6 wt % and less than or equal to 17 wt %). Other ranges are also possible.

As noted above, the articles described comprise an intrinsic binder, and the intrinsic binder may be present within a variety of suitable ranges. In accordance with some embodiments, an article has an amount of the a intrinsic binder of less than or equal to 45 wt %, less than or equal to 42 wt %, less than or equal to 40 wt %, less than or equal to 35 wt %, less than or equal to 25 wt %, less than or equal to 15 wt %, less than or equal to 5 wt %, less than or equal to 2 wt %, less than or equal to 1.5 wt %, or less than or equal to 1 wt %, with respect to the total weight of the article. In some cases, the article comprises the intrinsic binder at greater than or equal to 1 wt %, greater than or equal to 1.5 wt %, greater than or equal to 2 wt %, greater than or equal to 5 wt %, greater than or equal to 15 wt %, greater than or equal to 25 wt %, greater than or equal to 35 wt % of the intrinsic binder, greater than or equal to 40 wt %, greater than or equal to 42 wt %, or greater than or equal to 45 wt %, with respect to the total weight of the article. Combinations of the above-referenced ranges are possible (e.g., greater than or equal to 5% and less than or equal to 25%). Other ranges are also possible.

In some embodiments, the article has a particular thickness. In some embodiments, the article may have a thickness of greater than or equal to 1 mm, greater than or equal to 1.25 mm, greater than or equal to 1.5 mm, greater than or equal to 2 mm, greater than or equal to 5 mm, greater than or equal to 10 mm, greater than or equal to 15 mm, or greater than or equal to 20 mm. According to some embodiments, the thickness of the article may be less than or equal to 25 mm, less than or equal to 20 mm, less than or equal to 15 mm, less than or equal to 10 mm, less than or equal to 5 mm, less than or equal to 2 mm, less than or equal to 1.5 mm, or less than or equal to 1.25 mm. Combinations of the above-referenced ranges as also possible (greater than or equal to 1 mm and less than or equal to 25 mm). Other ranges are possible.

Additionally, an article may have many suitable ranges for porosity. In some embodiments, the article may have a porosity of greater than or equal to 25%, greater than or equal to 28%, greater than or equal to 30%, greater than or equal to 35%, greater than or equal to 45%, greater than or equal to 55%, greater than or equal to 65%, greater than or equal to 75%, greater than or equal to 78%, or greater than or equal to 80%. In accordance with some embodiments, the article may have a porosity of less than or equal to 80%, less than or equal to 78%, less than or equal to 75%, less than or equal to 70%, less than or equal to 60%, less than or equal to 50%, less than or equal to 40%, less than or equal to 30%, or less than or equal to 28%. Combinations of the above-referenced ranges are also possible (e.g., greater than or equal to 25% and less than or equal to 80%). Other ranges are possible. Porosity can as measured by using x-ray tomography.

A density of an article may have a variety of suitable ranges. In some cases, the density of the article is greater than or equal to 0.3 g/cm$^3$, greater than or equal to 0.35 g/cm$^3$, greater than or equal to 0.4 g/cm$^3$, greater than or equal to 0.5 g/cm$^3$, greater than or equal to 0.75 g/cm$^3$, greater than or equal to 1 g/cm$^3$, greater than or equal to 1.25 g/cm$^3$, greater than or equal to 1.50 g/cm$^3$, greater than or equal to 1.75 g/cm$^3$, or greater than or equal to 1.8 g/cm$^3$. In accordance with some embodiments, the density of an article is less than or equal to 1.8 g/cm$^3$, less than or equal to 1.75 g/cm$^3$, less than or equal to 1.5 g/cm$^3$, less than or equal to 1.25 g/cm$^3$, less than or equal to 1 g/cm$^3$, less than or equal to 0.75 g/cm$^3$, less than or equal to 0.5 g/cm$^3$, less than or equal to 0.4 g/cm$^3$, less than or equal to 0.35 g/cm$^3$, or less than or equal to 0.3 g/cm$^3$. Combinations of the above-referenced ranges are possible (greater than or equal to 0.3 g/cm$^3$ and less than or equal to 1.8 g/cm$^3$). Other ranges are also possible.

A density of each component of the article (e.g., a biodegradable material, a degraded material, an intrinsic binder, and/or an external binder) may have a variety of suitable ranges. In some cases, the density of a particular component of the article is greater than or equal to 0.3 g/cm$^3$, greater than or equal to 0.35 g/cm$^3$, greater than or equal to 0.4 g/cm$^3$, greater than or equal to 0.5 g/cm$^3$, greater than or equal to 0.75 g/cm$^3$, greater than or equal to 1 g/cm$^3$, greater than or equal to 1.25 g/cm$^3$, greater than or equal to 1.50 g/cm$^3$, greater than or equal to 1.75 g/cm$^3$, or greater than or equal to 1.8 g/cm³. In accordance with some embodiments, the density of a particular component of the article is less than or equal to 1.8 g/cm³, less than or equal to 1.75 g/cm³, less than or equal to 1.5 g/cm³, less than or equal to 1.25 g/cm³, less than or equal to 1 g/cm³, less than or equal to 0.75 g/cm³, less than or equal to 0.5 g/cm³, less than or equal to 0.4 g/cm³, less than or equal to 0.35 g/cm³, or less than or equal to 0.3 g/cm³. Combinations of the above-referenced ranges are possible (greater than or equal to 0.3 g/cm³ and less than or equal to 1.8 g/cm³). Other ranges are also possible. A density of an article may have a variety of suitable ranges. In some cases, the density of the article is greater than or equal to 0.3 g/cm³, greater than or equal to 0.35 g/cm³, greater than or equal to 0.4 g/cm³, greater than or equal to 0.5 g/cm³, greater than or equal to 0.75 g/cm³, greater than or equal to 1 g/cm³, greater than or equal to 1.25 g/cm³, greater than or equal to 1.50 g/cm³, greater than or equal to 1.75 g/cm³, or greater than or equal to 1.8 g/cm³. In accordance with some embodiments, the density of an article is less than or equal to 1.8 g/cm³, less than or equal to 1.75 g/cm³, less than or equal to 1.5 g/cm³, less than or equal to 1.25 g/cm³, less than or equal to 1 g/cm³, less than or equal to 0.75 g/cm³, less than or equal to 0.5 g/cm³, less than or equal to 0.4 g/cm³, less than or equal to 0.35 g/cm³, or less than or equal to 0.3 g/cm³. Combinations of the above-referenced ranges are possible (greater than or equal to 0.3 g/cm³ and less than or equal to 1.8 g/cm³). Other ranges are also possible.

A flexural strength of an article may also vary. The flexural strength can be measured by the standard test BS EN 12089:2013. In some embodiments, a flexural strength of the article is greater than or equal to 1 MPa, greater than or equal to 5 MPa, greater than or equal to 5.5 MPa greater than or equal to 6 MPa, greater than or equal to 7 MPa, greater than or equal to 8 MPa, greater than or equal to 9 MPa, greater than or equal to 10 MPa, greater than or equal to 11 MPa, greater than or equal to 12 MPa, greater than or equal to 13 MPa, greater than or equal to 14 MPa, greater than or equal to 14.5 MPa, or greater than or equal to 15 MPa. In some embodiments, a flexural strength of the article is greater than or equal to 20 MPa, greater than or equal to 30 MPa, or greater than or equal to 70 MPa. In some cases, the flexural strength of the article may be less than or equal to 15 MPa, less than or equal to 14.5 MPa less than or equal to 14 MPa, less than or equal to 13 MPa, less than or equal to 12 MPa, less than or equal to 11 MPa, less than or equal to 10 MPa, less than or equal to 9 MPa, less than or equal to 8 MPa, less than or equal to 7 MPa, less than or equal to 6 MPa, less than or equal to 5.5 MPa, less than or equal to 5 MPa, or less than or equal to 1 MPa. In some embodiments, a flexural strength of the article may be less than or equal to 70 MPa, less than or equal to 30 MPa, or less than or equal to 15 MPa. Combinations of the above-referenced ranges are possible (greater than or equal to 5 MPa and less than or equal to 15 MPa). Other ranges are also possible.

A tensile strength of an article may be of a suitable range. The tensile strength of an article can be measured by BS EN 1607:2013. In some embodiments, the tensile strength of the article is greater than or equal to 0.5 MPa, greater than or equal to 1 MPa, greater than or equal to 3 MPa, greater than or equal to 3.25 MPa greater than or equal to 3.5 MPa, greater than or equal to 3.75 MPa greater than or equal to 4 MPa, greater than or equal to 4.5 MPa, greater than or equal to 5 MPa, greater than or equal to 5.25 MPa, greater than or equal to 5.5 MPa, greater than or equal to 5.75 MPa, or greater than or equal to 6 MPa. In some embodiments, the tensile strength of the article is greater than or equal to 10 MPa, greater than or equal to 25 MPa, greater than or equal to 30 MPa, greater than or equal to 50 MPa, or greater than or equal to 65 MPa. In some cases, the tensile strength of the article was less than or equal to 6 MPa, less than or equal to 5.75 MPa, less than or equal to 5.5 MPa, less than or equal to 5.25 MPa, less than or equal to 5 MPa, less than or equal to 4.5 MPa, less than or equal to 4 MPa, less than or equal to 3.75 MPa, less than or equal to 3.5 MPa, less than or equal to 3.25 MPa, less than or equal to 3 MPa, less than or equal to 1 MPa, or less than or equal to 0.5 MPa. In some embodiments, the tensile strength of the article is less than or equal to 65 MPa, less than or equal to 50 MPa, less than or equal to 30 MPa, less than or equal to 25 MPa, or less than or equal to 10 MPa. Combinations of the above-referenced ranges are possible (greater than or equal to 0.5 MPa and less than or equal to 6 MPa). Other ranges are also possible.

Internal bond strength of the article may also be within a particular range. An internal bond strength of the article can be as measured using the BS EN 1607:2013 standard test. In some embodiments, an internal bond strength of the article is greater than or equal to 0.5 N/mm², greater than or equal to 0.55 N/mm², greater than or equal to 0.6 N/mm², greater than or equal to 0.7 N/mm², greater than or equal to 0.8 N/mm², greater than or equal to 0.9 N/mm², greater than or equal to 1.0 N/mm², greater than or equal to 1.1 N/mm², greater than or equal to 1.2 N/mm², greater than or equal to 1.3 N/mm², greater than or equal to 1.4 N/mm², greater than or equal to 1.5 N/mm², greater than or equal to 1.55 N/mm², or greater than or equal to 1.6 N/mm². In some embodiments, an internal bond strength of the article is less than or equal to 1.6 N/mm², less than or equal to 1.55 N/mm², less than or equal to 1.5 N/mm², less than or equal to 1.4 N/mm², less than or equal to 1.3 N/mm², less than or equal to 1.2 N/mm², less than or equal to 1.1 N/mm², less than or equal to 1.0 N/mm², less than or equal to 0.9 N/mm², less than or equal to 0.8 N/mm², less than or equal to 0.7 N/mm², less than or equal to 0.6 N/mm², less than or equal to 0.55 N/mm², or less than or equal to 0.5 N/mm². Combinations of the above-referenced ranges are also possible (e.g., greater than or equal to 0.5 N/mm² and less than or equal to 1.6 N/mm²). Other ranges are possible.

In some embodiments, an article may swell when exposed to water. In some cases, the swelling of the article can be determined by a standard test, such as by the standard test EN 317-1993. In some cases, the swelling may be determined as a change in thickness of the article (e.g., swelled thickness relative to an original thickness) and the change in thickness may be 0 mm. In some cases, the change in thickness is greater than 0 mm, greater than or equal to 0.05 mm, greater than or equal to 0.10 mm, greater than or equal to 0.15 mm, greater than or equal to 0.2 mm, greater than or equal to 0.25 mm, greater than or equal to 0.3 mm, greater than or equal to 0.35 mm, greater than or equal to 0.5 mm, greater than or equal to 1 mm, greater than or equal to 1.5 mm, greater than or equal to 2 mm, greater than or equal to 2.5 mm, or greater than or equal to 3 mm. In some cases, the change in thickness of the article when exposed to water is less than or equal to 3 mm, less than or equal to 2.5 mm, less than or equal to 2 mm, less than or equal to 1.5 mm, less than or equal to 1 mm, less than or equal to 0.5 mm, less than or equal to 0.35 mm, less than or equal to 0.3 mm, less than or equal to 0.25 mm, less than or equal to 0.2 mm, less than or equal to 0.15 mm, or less than or equal to 0.1 mm. Combinations of the above-referenced ranges are possible (e.g., greater than or equal to 0.1 mm less than or equal to 3 mm). Other ranges are possible.

In some embodiments, the swelling of the article is determined by a percent change (e.g., the percent change in thickness from the initial thickness, e.g., (((swelled thickness relative to an original thickness) divided by original thickness)*100). In some embodiments, the swelling of the article when exposed to water is greater than or equal to 30% greater than or equal to 35%, greater than or equal to 40%, greater than or equal to 45%, greater than or equal to 50%, greater than or equal to 55%, or greater than 60%. In some cases, the swelling of the article when exposed to water is less than or equal to 60%, less than or equal to 55%, less than or equal to 50%, less than or equal to 45%, less than or equal to 40%, less than or equal to 35%, or less than or equal to 30%. Combinations of the above-referenced ranges are also possible (e.g., greater than or equal to 30% and less than or equal to 60%). Other ranges are possible.

In some embodiments, an article exhibits a particular hardness. The article may have a D-shore hardness of greater than or equal to 15, greater than or equal to 20, greater than or equal to 25, greater than or equal to 30, greater than or equal to 35, greater than or equal to 40, greater than or equal to 45, greater than or equal to 50, greater than or equal to 55, greater than or equal to 60, greater than or equal to 65, greater than or equal to 70, or greater than or equal to 75. In some cases, the surface finish has a D-shore hardness of less than or equal to 80, less than or equal to 75, less than or equal to 70, less than or equal to 65, less than or equal to 60, less than equal to 55, less than or equal to 50, less than or equal to 45, less than or equal to 40, less than or equal to 35, less than or equal to 30, less than or equal to 25, or less than or equal to 20. Combinations of the above-referenced ranges are possible (e.g., greater than or equal to 15 and less than or equal to 80). Other ranges are also possible. A D-shore hardness of the article can be determined by the ASTM D2240 standard test.

In some embodiments, the biodegradable material (and/or a decomposition product of the biodegradable material) imparts advantageous properties (e.g., resistance to microbial growth, stiffness, water resistance) to the article. In some such embodiments, a compound of the biodegradable material (e.g., limonene) may persist in an article even after one or more processing techniques, such that the compound from the biodegradable material imparts properties to the article. By contrast, many existing articles perform processing steps that significantly alter or destroy compounds used as feedstock biodegradable materials. However, it has been advantageously discovered, within the context of this disclosure, that processing techniques can be selected that preserve beneficial compounds from the biodegradable material (e.g., by selecting a temperature during heat treatments that preserves one or more compounds from the biodegradable material). In some embodiments, an amount of a compound from the biodegradable compound is present in an article. In some embodiments, the article has greater than or equal to 0.05 wt %, greater than or equal to 0.1 wt %, greater than or equal to 0.5 wt %, greater than or equal to 1 wt %, greater than or equal to 3 wt %, greater than or equal to 5 wt %, greater than or equal to 7 wt %, or greater than or equal to 10 wt % of the compound from the biodegradable material, with respect to the total weight of the article. In some embodiments, the article has less than or equal to 10 wt %, less than or equal to 7 wt %, less than or equal to 5 wt %, less than or equal to 3 wt %, less than or equal to 1 wt %, or less than or equal to 0.5 wt %, less than or equal to 0.1 wt %, or less than or equal to 0.05 wt % of the compound from the biodegradable material, with respect to the total weight of the article. Combinations of the above-referenced ranges are also possible (e.g., greater than or equal to 0.1 wt % and less than or equal to 10 wt %). Other ranges are possible.

As noted above, the articles described herein may be resistant to microbial growth. The bioresistance (e.g., a measure of a susceptibility of growing fungal spores on a material) of an article and/or its components (e.g., a biodegradable material comprising a, a intrinsic binder, an intrinsic binder) can be a variety of suitable values and can be measured via a number of methods, according to some embodiments. In some cases, as determined by an ASTM C1338 standard test, the article has a bioresistance of less than or equal to 3, less than or equal to 2, less than or equal to 1, or 0.

Figure 2:
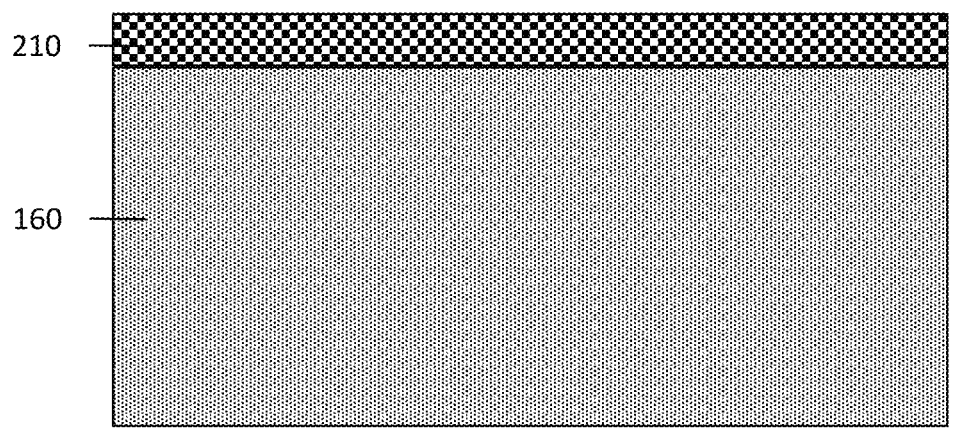
FIG. 2 is an illustrative example showing a surface finish on an article, according to some embodiments.

An article as described herein may further comprise a surface finish. In some embodiments, the surface finish is a coating on the article, wherein it coats at least a portion of the biodegradable material and/or the intrinsic binder or the article. For instance, FIG. 2 is an illustrative example showing an article 220 (e.g., comprising a biodegradable material, the intrinsic binder, the intrinsic binder, and/or the external binder), wherein a surface finish is applied as a coating 210 on the article. In this non-limiting example, the surface finish is shown as applied to only one side of the article. However, the surface finish may coat a portion of the article or the entirety of the article.

The surface finish may comprise a variety of suitable materials in order to obtain various properties of the article (e.g., water content, flame resistance). For example, the surface finish may impart a variety or properties to the article. Non-limiting examples of properties provided to the article by the surface finish include flame resistance, water resistance, and/or resistance from biological degradation. For example, in some embodiments, the surface finish is hydrophobic. In some embodiments, the surface finish of the article reduces a swelling of the article relative the article with no surface finish.

To impart such properties, the surface finish may comprise a variety of suitable compounds or materials, in accordance with some embodiments. For example, as noted above, in some cases, the surface finish comprises a hydrophobic material. In some such embodiments, the hydrophobic material comprises pine resin. In some cases, the surface finish comprises shellac, rapeseed wax, linseed oil, limonene oil, fibers comprising sugar cane and/or grass, flower petals, coffee beans, orange peel, glycerol, and/or naturally occurring dyes. In some such cases, wherein the surface finish comprises naturally occurring dyes, the naturally occurring dyes comprise beetroot powder, blue pea powder, and/or charcoal, as non-limiting examples. Other compounds which are suitable for being a surface finish include sodium tetraborate decahydrate, boric acid, and/or diammonium hydrogen phosphate. In some embodiments, the surface finish comprises a naturally derived compound. Other surface finishes are also possible. Combinations of the above-referenced compounds and materials as surface finishes are possible (e.g., limonene oil and coffee beans). Other such combinations are also possible.

A surface finish, in some embodiments, may impart a hydrophobicity to an article (e.g., a surface finish comprising pine resin). The hydrophobicity may be measured by measuring a water contact angle of the article. In some embodiments, the water contact angle is greater than 90°, greater than or equal to 95°, greater than or equal to 100°, greater than or equal to 105°, greater than or equal to 110°, greater than or equal to 115°, greater than or equal to 120°, greater than or equal to 125°, greater than or equal to 130°, greater than or equal to 135°, or greater than or equal to 140°. In some embodiments, the water contact angle of the article is less than or equal to 140°, less than or equal to 135°, less than or equal to 130°, less than or equal to 125°, less than or equal to 120°, less than or equal to 115°, less than or equal to 110°, less than or equal to 105°, less than or equal to 100°, less than or equal to 95°, or less than or equal to is greater than 90°. Combinations of the above-referenced ranges are also possible (e.g., greater than or equal to 95° and less than or equal to 125°). Other ranges are possible.

In some embodiments, the surface finish has a D-shore hardness of greater than or equal to 40, greater than or equal to 45, greater than or equal to 50, greater than or equal to 55, greater than or equal to 60, greater than or equal to 65, greater than or equal to 70, greater than or equal to 75, or greater than or equal to 80. In some cases, the surface finish has a D-shore hardness of less than or equal to 80, less than or equal to 75, Less than or equal to 70, less than or equal to 65, less than or equal to 60, center equal to 55, less than or equal to 50, less than or equal to 45, or less than or equal to 40. Combinations of the above-referenced ranges are also possible (e.g., greater than or equal to 40 and less than or equal to 80). Other ranges are possible.

In some embodiments, the thickness of the surface finish may change when immersed in water. In some embodiments, a change in thickness of the surface finish when immersed in water is less than or equal to 3 mm, less than or equal to 2.5 mm, less than or equal to 2 mm, less than or equal to 1.5 mm, less than or equal to 1 mm, less than or equal to 0.75 mm, less than or equal to 0.5 mm, or less than or equal to 0.25 mm. In some cases, the change in thickness of the surface finish when immersed in water is greater than 0 mm, greater than or equal to 0.25 mm, greater than or equal to 0.5 mm, greater than or equal to 0.75 mm, greater than or equal to 1 mm, greater than or equal to 1.5 mm, greater than or equal to 2 mm, greater than or equal to 2.5 mm, or greater. Combinations of the above-referenced ranges are also possible (e.g., greater than or equal to 2 mm and less than or equal to 3 mm). Other ranges are possible. A change in thickness of the surface finish can be determined by the standard test BS EN 317-1993.

As was mentioned above, methods described herein may be suitable for producing articles with a variety of suitable properties. In some cases, a biodegradable material comprising is processed (e.g., pre-processed, pre-treated, processed before generating a decomposition product of a biodegradable material, processing after generating a decomposition product of the biodegradable material). Processing the biodegradable material may comprise a number of various techniques (e.g., mechanical processing, chemical processing, hydrothermal processing).

Processing the biodegradable material may comprise reducing the size of particles of the. Reducing the size of particles in the may comprise cutting, grinding, chipping, blending, chopping, and/or other suitable technique for modulating the size of particles within the. In some such embodiments, reducing the particle size of the biodegradable material comprises reducing the average particle size of the particles such that the average diameter of the biodegradable material (e.g., particles comprising the biodegradable material, a first portion of the biodegradable material, a second portion of the biodegradable material) is less than or equal to 15 mm and/or greater than or equal to 0.005 mm. In some embodiments, an average diameter of the biodegradable material is less than or equal to 0.005 nm, less than or equal to 10 mm, less than or equal to 8 mm, less than or equal to 5 mm, less than or equal to 3 mm, or less than or equal to 1 mm. In some embodiments, an average diameter of the biodegraded material is greater than or equal to 1 mm, greater than or equal to 3 mm, greater than or equal to 5 mm, greater than or equal to 8 mm, greater than or equal to 10 mm, or greater than or equal to 15 mm. Suitable sizes for particles comprising the biodegradable material (e.g., comprising a decomposition product of the biodegradable material) after reducing the size of particles is discussed elsewhere herein.

In some cases, processing a biodegradable material comprises heating the biodegradable material to a first temperature. The first temperature may be greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., greater than or equal to 210° C., or greater than or equal to 220° C. In some cases, the first temperature may be less than or equal 220° C., less than or equal 210° C., less than or equal 200° C., less than or equal 190° C., less than or equal 180° C., less than or equal 170° C., less than or equal 160° C., less than or equal 150° C., less than or equal 140° C., less than or equal 130° C., less than or equal 120° C., less than or equal 110° C., or less than or equal to 100° C. Combinations of the above-referenced ranges are also possible (e.g., greater than or equal to 100° C. and less than or equal to 220° C.). Other ranges are possible. Heating the biodegradable material may comprise placing the biodegradable material in an oven, exposing the biodegradable material to a heat source (e.g., a flame, the sun, a heat lamp), or other suitable methods known to those skilled in the art.

In some embodiments, processing a biodegradable material may comprise cooling the from a first temperature to a second temperature. In some such cases, the second temperature is less than or equal to 5° C., less than or equal to 10° C., less than or equal to 20° C., less than or equal to 30° C., less than or equal to 40° C., less than or equal to 50° C., less than or equal to 60° C., less than or equal to 70° C., less than or equal to 80° C., less than or equal to 90° C., or less than or equal to 100° C. less than the first temperature. Cooling may proceed ambiently, by removing the heat source from the vicinity of the biodegradable material, or by other methods known to those skilled in the art.

Processing a biodegradable material may comprise adjusting the water content within the biodegradable material or an article (e.g., an article comprising a biodegradable material, a degraded material, an intrinsic binder, and/or an external binder). In some cases, adjusting the water content may comprise removing water from the biodegradable material. Removing water from the biodegradable material may comprise, evaporating the water, compressing the biodegradable material to extricate the water from a lattice and/or matrix of the biodegradable material, placing the biodegradable material in a low-humidity environment, or other methods known to those skilled in the art. In some embodiments, greater than or equal to 1 wt %, greater than or equal 10 wt %, greater than or equal 20 wt %, greater than or equal 30 wt %, greater than or equal 40 wt %, greater than or equal 50 wt %, or greater than or equal 60 wt % of the water content is removed from the biodegradable material (relative to a hydrated state of the biodegradable material). In some cases, less than or equal to 60 wt %, less than or equal to 50 wt %, less than or equal to 40 wt %, less than or equal to 30 wt %, less than or equal to 20 wt %, or less than or equal to 10 wt % of the water content of the biodegradable material is removed. Combinations of the above-referenced ranges are possible (greater than or equal to 1 wt % and less than or equal to 60 wt %). Other ranges are possible.

In some cases, adjusting the water content within a biodegradable material comprises hydrating the biodegradable material from a first moisture content to a second moisture content. Hydrating the biodegradable material may comprise directly adding water to the biodegradable material, placing the biodegradable material in a high-humidity environment, or other suitable methods known to those skilled in the art. In some cases, hydrating the biodegradable material comprises increasing the moisture content within the biodegradable material by less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 10 wt %, or less than or equal to 1 wt %. In accordance with some embodiments, hydrating the biodegradable material comprises increasing the moisture content within the biodegradable material by greater than or equal to 1 wt %, greater than or equal to 10 wt %, greater than or equal to 20 wt %, greater than or equal to 30 wt %, greater than or equal to 40 wt %, greater than or equal to 50 wt %, greater than or equal to 60 wt %, greater than or equal to 70 wt %, or greater than or equal to 80 wt %. Combinations of the above-referenced ranges are also possible (e.g., greater than or equal to 1 wt % and less than or equal to 80 wt %). Other ranges are possible.

In some embodiments, a biodegradable material and/or an article may be treated with steam. Advantageously, steam treatment may allow for the formation of at least some decomposition products of the biodegradable material without significantly damaging the biodegradable material (e.g., so that the degraded material formed from the biodegradable material maintains at least some structure). Providing steam may comprise, in some embodiments, exposing the biodegradable material to steam at a temperature of greater than or equal to 100° C., greater than or equal to 110° C., greater than or equal to 120° C., greater than or equal to 130° C., greater than or equal to 140° C., greater than or equal to 150° C., greater than or equal to 160° C., greater than or equal to 170° C., greater than or equal to 180° C., greater than or equal to 190° C., greater than or equal to 200° C., or greater than or equal to 210° C. In some cases, the providing steam may comprise exposing the biodegradable material to steam at a temperature of less than or equal to 220° C., less than or equal to 210° C., less than or equal to 200° C., less than or equal to 190° C., less than or equal to 180° C., less than or equal to 170° C., less than or equal to 160° C., less than or equal to 150° C., less than or equal to 140° C., less than or equal to 130° C., less than or equal to 120° C., or less than or equal to 110° C. Combinations of the above-referenced ranges are possible (e.g., greater than or equal to 100° C. and less than or equal to 220° C.). Other ranges are also possible.

In some cases, when providing steam, the steam may be present at a variety of pressures when exposing a biodegradable material and/or the article to the steam. In some cases, the steam is present at a pressure of greater than or equal to 2 MPa, greater than or equal to 3 MPa, greater than or equal to 4 MPa, greater than or equal to 5 MPa, greater than or equal to 6 MPa, greater than or equal to 7 MPa, greater than or equal to 8 MPa, greater than or equal to 9 MPa, greater than or equal to 10 MPa, greater than or equal to 11 MPa, or greater than or equal to 12 MPa. In some embodiments, the steam is present at a pressure of less than or equal to 12 MPa, less than or equal to 11 MPa, less than or equal to 10 MPa, less than or equal to 9 MPa, less than or equal to 8 MPa, less than or equal to 7 MPa, less than or equal to 6 MPa, less than or equal to 5 MPa, less than or equal to 4 MPa, less than or equal to 3 MPa, less than or equal to 2 MPa, or less than or equal to 1 MPa. Combinations of the above-referenced ranges are also possible (e.g., greater than or equal to 2 MPA and less than or equal to 12 MPa). Other ranges are possible.

Other methods for adjusting the water content within a biodegradable material and/or an article are possible and are known to those skilled in the art. Non-limiting examples of other methods for adjusting the water content within the biodegradable material include evaporating, lyophilizing, and/or exposing the biodegradable material to hygroscopic materials. Of course, further methods for adjusting the water content within the biodegradable material are possible, as this disclosure is not so limiting. Combinations of these methods are also contemplated.

Further steps for processing a biodegradable material (e.g., an article comprising the biodegradable material) possible. For example, the biodegradable material may be treated with acid and/or base. During acid treatment of a biodegradable material, the acid may comprise sulfuric acid, hydrochloric acid, sulfuric acid, acetic acid, citric acid, and/or sorbic acid. In some cases, during base treatment of the biodegradable material, the base may comprise sodium hydroxide, potassium hydroxide, calcium hydroxide, and/or ammonium hydroxide. Of course, other acids and/or bases for the acid and/or base treatment of the biodegradable material are possible, as this disclosure is not so limiting.

In some cases, a biodegradable material (e.g., an article comprising the biodegradable material) is soaked in an acid for a period of time of greater than or equal to 1 minute, greater than or equal to 5 minutes, greater than or equal to 1 hour, greater than or equal to 2 hours, greater than or equal to 5 hours, greater than or equal to 10 hours, greater than or equal to 15 hours, greater than or equal to 20 hours, greater than or equal to 25 hours, greater than or equal to 30 hours, greater than or equal to 35 hours, greater than or equal to 40 hours, greater than or equal to 45 hours, or greater than or equal to 48 hours. Soaking the biodegradable material in an acid may proceed for a period of time of less than or equal to 48 hours, less than or equal to 45 hours, less than or equal to 40 hours, less than or equal to 35 hours, less than or equal to 30 hours, less than or equal to 25 hours, less than or equal to 20 hours, less than or equal to 15 hours, less than or equal to 10 hours, less than or equal to 5 hours, less than or equal to 2 hours, less than or equal to 1 hour, less than or equal to 5 minutes, or less than or equal to 1 minute. Combinations of the above-referenced ranges are also possible (e.g., greater than or equal to 1 hour and less than or equal to 48 hours). Other ranges are possible. In some cases, the pH of the acid may be less than 7, less than or equal to 6, less than or equal to 5, less than or equal to 4, less than or equal to 3, less than or equal to 2, less than or equal to 1, or less than or equal to 0. In some embodiments, the pH of the acid may be greater than or equal to 0, greater than or equal to 1, greater than or equal to 2, greater than or equal to 3, greater than or equal to 4, greater than or equal to 5, or greater than or equal to 6. Combinations of the above-referenced ranges are possible (e.g., pH greater than or equal to 0 and less than or equal to 6). Other ranges are also possible.

In some embodiments, a biodegradable material (e.g., an article comprising the biodegradable material) is soaked in a base for a period of time of greater than or equal to 1 minute, greater than or equal to 5 minutes, greater than or equal to 1 hour, greater than or equal to 2 hours, greater than or equal to 5 hours, greater than or equal to 10 hours, greater than or equal to 15 hours, greater than or equal to 20 hours, greater than or equal to 25 hours, greater than or equal to 30 hours, greater than or equal to 35 hours, greater than or equal to 40 hours, greater than or equal to 45 hours, or greater than or equal to 48 hours. Soaking the biodegradable material in an acid may proceed for a period of time of less than or equal to 48 hours, less than or equal to 45 hours, less than or equal to 40 hours, less than or equal to 35 hours, less than or equal to 30 hours, less than or equal to 25 hours, less than or equal to 20 hours, less than or equal to 15 hours, less than or equal to 10 hours, less than or equal to 5 hours, less than or equal to 2 hours, less than or equal to 1 hour, less than or equal to 5 minutes, or less than or equal to 1 minute. Combinations of the above-referenced ranges are also possible (e.g., greater than or equal to 1 hour and less than or equal to 48 hours). Other ranges are possible. In some cases, the pH of the base may be less than or equal to 14, less than or equal to 13, less than or equal to 12, less than or equal to 11, less than or equal to 10, less than or equal to 9, or less than or equal to 8. In some embodiments, the pH of the base may be greater than 7, greater than or equal to 8, greater than or equal to 9, greater than or equal to 10, greater than or equal to 11, greater than or equal to 12, or greater than or equal to 13. Combinations of the above-referenced ranges are also possible (e.g., pH greater than or equal to 8 and less than or equal to 14). Other ranges are possible.

Processing a biodegradable material may comprise compressing the biodegradable material, wherein the compressing comprises applying a pressure of greater than or equal to 2 MPa, greater than or equal to 3 MPa, greater than or equal to 4 MPa, greater than or equal to 5 MPa, greater than or equal to 6 MPa, greater than or equal to 7 MPa, greater than or equal to 8 MPa, greater than or equal to 9 MPa, greater than or equal to 10 MPa, greater than or equal to 11 MPa, or greater than or equal to 12 MPa. In some cases, compressing may comprise applying a pressure of less than or equal to 12 MPa, less than or equal to 11 MPa, less than or equal to 10 MPa, less than or equal to 9 MPa, less than or equal to 8 MPa, less than or equal to 7 MPa, less than or equal to 6 MPa, less than or equal to 5 MPa, less than or equal to 4 MPa, less than or equal to 3 MPa, or less than or equal to 2 MPa.

Processing a biodegradable material (e.g., an article comprising the biodegradable material) by compressing it (e.g., by applying a pressure) may be performed in a number of suitable methods known to those skilled in the art. In some cases, applying a pressure may comprise applying a pressure uniformly. In other cases, applying the pressure may comprise applying the pressure non-uniformly. In some cases, when pressure is applied to the biodegradable material, heat may be applied concurrently with the pressure (e.g., heat pressing the biodegradable material). Applying heat may occur during only a portion or throughout the entirety of the compression process. In some cases, applying heat to the biodegradable material may comprise changing the temperature as disclosed elsewhere herein (e.g., increase the temperature of the biodegradable material to greater than or equal to 100° C. and less than or equal to 220° C.). In some embodiments, compressing and/or heating the biodegradable material may result in no changes to the weight of the biodegradable material. In other cases, a change in weight (measured as a percent change) in the biodegradable material of greater than 0%, greater than or equal to 2%, greater than or equal to 4%, greater than or equal to 6%, greater than or equal to 8%, greater than or equal to 10%, greater than or equal to 12%, greater than or equal to 14%, greater than or equal to 16%, or greater than or equal to 18% is measured. In some cases, the change in weight of the biodegradable material is less than or equal to 20%, less than or equal to 18%, less than or equal to 16%, less than or equal to 14%, less than or equal to 12%, less than or equal to 10%, less than or equal to 8%, less than or equal to 6%, less than or equal to 4%, or less than or equal to 2%. Combinations of the above-referenced ranges are also possible (greater than or equal to 10% and less than or equal to 12%). Other ranges are possible.

In some cases, processing a biodegradable material comprises pretreating the biodegradable material in any number of suitable methods. Such pretreating steps may comprise mechanical (e.g., compression), chemical (e.g., acid/base treatment), biological (e.g., decomposition), and or hydrothermal pretreatment (e.g., exposure to steam), as described elsewhere herein.

In some embodiments, processing a biodegradable material may form an intrinsic binder (e.g., an intrinsic binder comprising one or more decomposition products of the biodegradable material). In some such cases, only a portion of the biodegradable material may form the intrinsic binder. In some cases, processing the biodegradable material forms the intrinsic binder, wherein further processing steps may be performed to further process the biodegradable material and the intrinsic binder.

A method may further comprise adding an additional binder (e.g. an external binder) to a biodegradable material. For example, the method may comprise adding an external binder to the biodegradable material and the intrinsic binder (e.g., comprising a decomposition product of the biodegradable material). In some cases, the method further comprises adding and/or mixing the external binder with the biodegradable material and/or the intrinsic binder. According to some embodiments, the external binder is only added to a portion of the biodegradable material and/or the intrinsic binder. However, according to other embodiments, the external binder is added to the entirety of the biodegradable material and/or the intrinsic binder. In some embodiments, an external binder is added to the biodegradable material, a degraded material, and/or an intrinsic binder to form an article with a first set of properties. After the addition of the external binder and formation of the article with the first set of properties, the article may be further processed through any of the steps disclosed elsewhere herein to obtain an article with a second set of properties wherein the second set of properties and first set of properties are different.

In some embodiments, a biodegradable material (e.g., an article comprising the biodegradable material) comprising a first configuration may be molded to a second configuration. In some cases, the first configuration may be randomly oriented material (e.g., a stochastic stack and/or matrix of the biodegradable material comprising a such as coffee grounds and/or orange peels). In some embodiments, the first configuration, which may or may not comprise randomly oriented biodegradable material, may be molded into the second configuration. In some cases, the second configuration comprises a mat. In some cases, the mat may be a rectangular prism, a cube, a sphere, a triangular prism, or any other regular or irregular shape. A variety of containers for molding are known in the art and those skilled in the art in view of the present disclosure will be capable of selecting an appropriate container to mold the article.

The method may also further comprise applying a surface finish and/or coating to a biodegradable material (e.g., an article comprising the biodegradable material). The surface finish and/or coating may comprise any suitable compound or material as disclosed elsewhere herein. Depending on the surface finish and/or coating, applying a suitable compound and/or material may plasticize the biodegradable material or an article comprising the biodegradable material.

Note that while the above processing steps have been primarily described in the context of a biodegradable material (e.g., comprising a), the processing steps may be performed in the presence of the biodegradable material, a intrinsic binder, an intrinsic binder, an external binder, and/or any other suitable materials (e.g., plasticizing additives, antimicrobial agents). Furthermore, while listed in the present disclosure in a particular order, the steps are not limited to being performed in the listed order. That is, the processing steps may be performed in any order, as well as independently and/or in combination with each other. Furthermore, the listed processing steps may occur multiple times independently of each other. As a non-limiting example, the biodegradable material may be compressed a first time, then heated, and then compressed a second time. Of course, other exemplary processing steps and orders of the processing steps have been contemplated, as this disclosure is not so limited.

The articles described herein are suitable for a variety of purposes. For example, in one embodiment, the article is an insulation material. In another embodiment the article may be used as a wall covering or drylining. In some embodiments, the article can be a component of flooring, sheet building material, furniture, ceiling tiling, product designs, interior designs, automatic and/or aerospace interiors. Of course, other applications are possible as this disclosure is not so limited, and those skilled in the art in view of this disclosure will be able to provide other applications for the articles described herein.

The following examples are intended to illustrate certain embodiments of the present invention, but do not exemplify the full scope of the invention.

Example 1

The following example describes the preparation of a composite board where the biodegradable material comprises the biodegradable orange peels (OPs).

Pre-Treatment
  Raw OP rinds were dehydrated to adjust water content to ~10% by a flow of hot air.
  Dried OP is then hammermilled to reduce particle size to between 1-3 mm
  The pre-treated OP composition is analyzed showing 7-11 w/w % cellulose and 4-8% lignin Composite Forming
  The powdered OP was analyzed for:
    moisture content and adjusted appropriately; and
    particle size
  OP was then weighed and distributed into the heated compression mold (sample thickness/depth=12 mm)
  The powder is compressed with an applied pressure of 8 MPa at a heat of 145° C.
  After a heating duration, the sample is left to cool before the composite sample is released from the mold.
  The composite sample was then subjected to a final curing step within a dehydrator.

Material Testing
  The final sample was then characterized by a series of tests to determine values within a specified range. For OP the sample was checked for at least the following properties:
  Porosity=30%
  Density=1.5 g/cm^3
  Flexural Strength=15 MPa
  Tensile Strength=10 MPa
  Water Adsorption: Weight Gain=−12.5% (BS EN 317, a negative mass indicating no water was lost)
  Hardness (D-Shore Scale)=80 D
  Bioresistance=3 (ASTM C1338)

Post-Treatment
  To enhance water and bio-resistance the surfaces of the final composite are coated with linseed oil/wax mixture and allowed to dry
  Optionally, limonene-oil can be added topically, in the form of oil, or infused wax, to improve bioresistance performance of the final article.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the above-referenced embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An article, comprising:
   a biodegradable material comprising a wt % of lignin of greater than or equal 0.05 wt % and/or less than or equal to 7 wt % and having a first portion and a second portion; and
   an intrinsic binder comprising a decomposition product of the biodegradable material, wherein the intrinsic binder is bound to the first portion and the second portion of the biodegradable material,
   wherein:
   a thickness of the article is greater than or equal to 1 mm and/or less than or equal to 25 mm;
   a porosity of the article is greater than or equal to 25% and less than or equal to 80%;
   a density of the article is greater than or equal to 0.3 g/cm$^3$ and less than or equal to 1.8 g/cm$^3$; and
   an amount of glucan in the article is less than or equal to 47 wt %.

2. An article, comprising:
   a biodegradable material comprising a wt % of lignin of greater than or equal 0.05 wt % and/or less than or equal to 7 wt % and having a first portion and a second portion; and
   an intrinsic binder comprising a decomposition product of the biodegradable material, wherein the intrinsic binder is bound to the first portion and the second portion of the biodegradable material,
   wherein:
   a thickness of the article is greater than or equal to 1 mm and/or less than or equal to 25 mm;
   a porosity of the article is greater than or equal to 25% and less than or equal to 80%;
   a density of the article is greater than or equal to 0.3 g/cm$^3$ and less than or equal to 1.8 g/cm$^3$; and
   an amount of glucan in the article is greater than or equal to 54 wt %.

3. The article of claim 1, further comprising an external binder, wherein the external binder is bound to at least a portion of the intrinsic binder and the first portion or the second portion of the biodegradable material, and wherein the external binder is greater than or equal to 0.01 wt % with respect to a total weight of the article.

4. The article of claim 1, wherein an amount of glucan in the article is greater than or equal to 0.1 wt % and less than 47 wt % with respect to a total weight of the article.

5. The article of claim 1, wherein an amount of glucan in the article is greater than 54 wt % and less than or equal to 90 wt % with respect to a total weight of the article.

6. The article of claim 1, wherein the intrinsic binder is formed, at least in part, from the biodegradable material.

7. The article of claim 1, wherein greater than or equal to 20% of article is crosslinked and/or less than or equal to 99.99 wt % of the article is crosslinked.

8. The article of claim 1, wherein a flexural strength of the article is greater than or equal to 1 MPa and/or less than or equal to 70 MPa.

9. The article of claim 1, wherein a tensile strength of the article is greater than or equal to 0.5 MPa and/or less 65 MPa.

10. The article of claim 1, wherein an internal bond strength of the article is greater than or equal to 0.5 N/mm$^2$ and/or less than or equal to 1.6 N/mm$^2$.

11. The article of claim 1, wherein a swelling thickness of the article after immersion in water is greater than or equal to 0 mm and/or less than or equal to 3 mm.

12. The article of claim 1, wherein a hardness of the article is greater than or equal to 15 D and/or less than or equal to 80 D.

13. The article of claim 1, wherein the article has a bioresistence of 3, as determined by an ASTM-C1338 standard test.

14. The article of claim 1, wherein the biodegradable material is greater than or equal to 55 wt % of the article.

15. The article of claim 1, wherein the intrinsic binder is less than or equal to 45 wt % of the article.

16. The article of claim 1, wherein the biodegradable material comprises orange peels and/or coffee chaff.

17. A method, comprising:
- with a biodegradable material comprising a wt % of lignin of greater than or equal 0.05 wt % and/or less than or equal to 7 wt % and having a first portion and a second portion, performing the steps of:
- reducing a particle size of the biodegradable material to an average diameter of less than or equal to 10 mm and/or greater than or equal to 1 mm;
- degrading at least a portion of the biodegradable material into a decomposition product of the biodegradable material and a degraded material; and
- forming an intrinsic binder comprising the decomposition product of the biodegradable material, wherein the intrinsic binder is bound to the first portion and the second portion of the biodegradable material,
- wherein an amount of glucan in the biodegradable material is less than or equal to 47 wt %.

18. The method of claim 17, further comprising applying a surface finish and/or a coating to the intrinsic binder, the first portion and the second portion of the biodegradable material.

* * * * *